Dec. 31, 1968   J. E. SHULTZ ETAL   3,418,991
VEHICLE FUEL SYSTEM
Filed June 12, 1967   Sheet 1 of 4

INVENTORS
John E. Shultz,
Richard P. Ballou,
Robert B. Gelenius, &
Harold A. Haven
BY Hugh L. Fisher
ATTORNEY

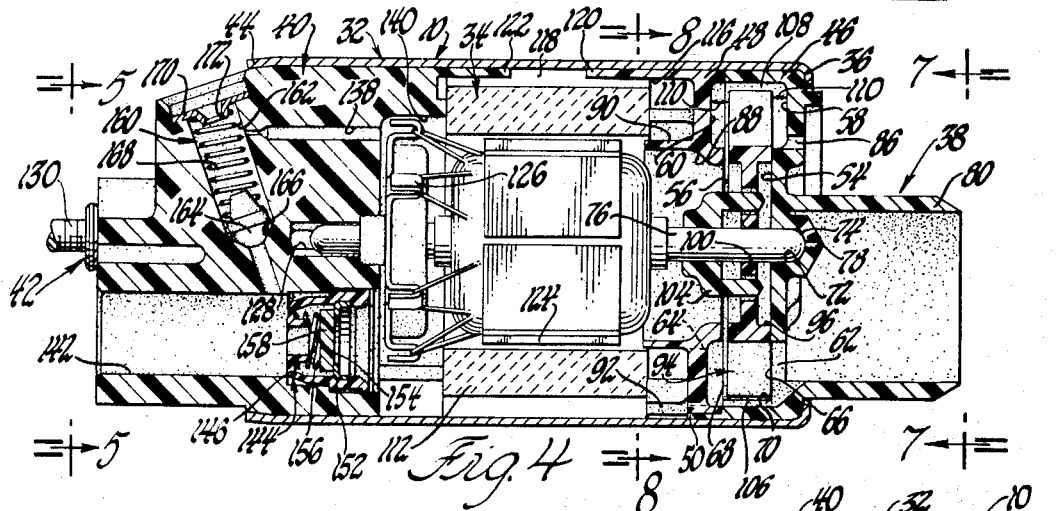
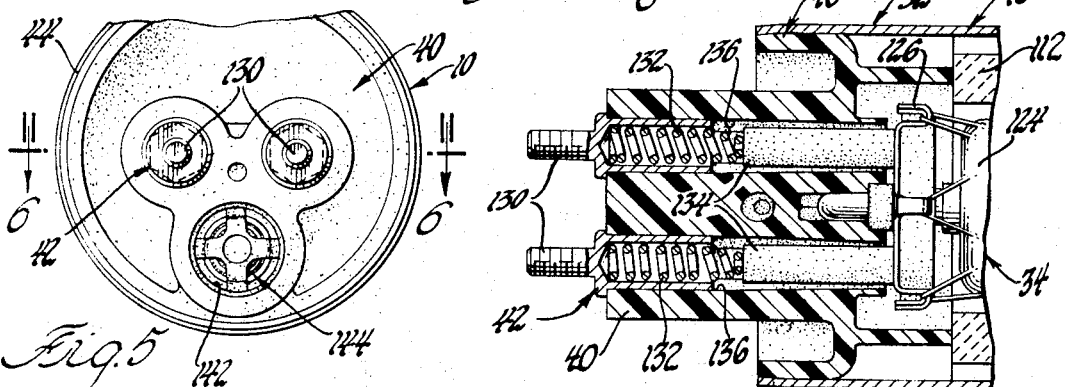
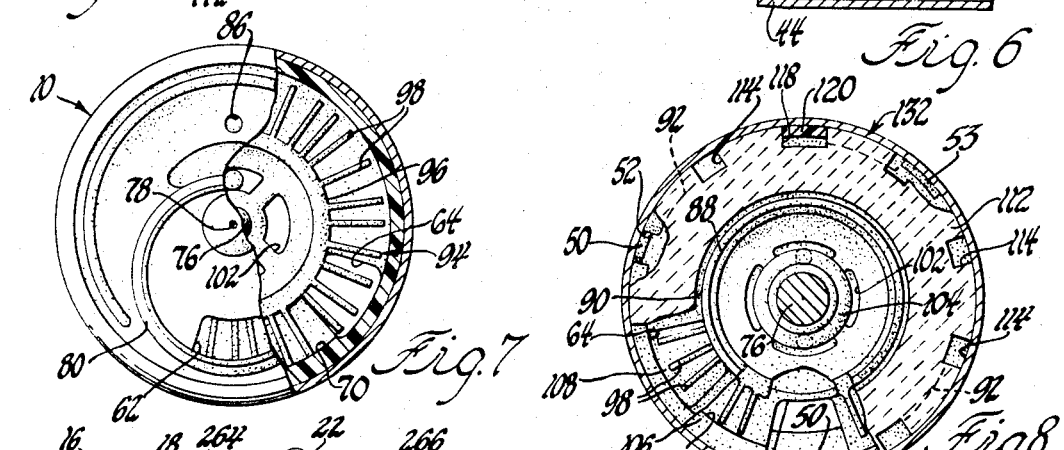
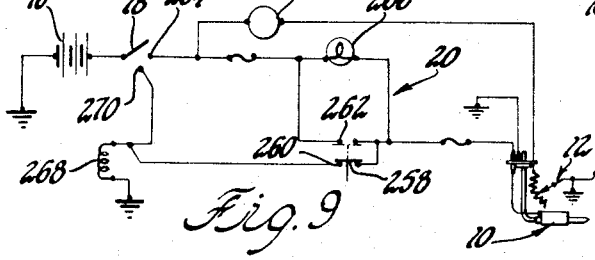

Dec. 31, 1968   J. E. SHULTZ ET AL   3,418,991

VEHICLE FUEL SYSTEM

Filed June 12, 1967   Sheet 3 of 4

INVENTORS
John E. Shultz,
Richard P. Ballou,
Robert B. Gelenius &
Harold A. Haven
BY
Hugh L. Fisher
ATTORNEY INVENTORS
John E. Shultz,
Richard P. Ballou,
Robert B. Gelenius &
Harold A. Haven
BY Hugh L. Fisher
ATTORNEY

3,418,991
VEHICLE FUEL SYSTEM

John E. Shultz, Davison, Richard P. Ballou, Howell, Robert B. Gelenius, Flint, and Harold A. Haven, Fenton, Mich., assignors to General Motors Corporation, Detroit, Mich., a corporation of Delaware
Filed June 12, 1967, Ser. No. 645,150
25 Claims. (Cl. 123—179)

ABSTRACT OF THE DISCLOSURE

A vehicle fuel system incorporating a fuel tank suspended fuel pump assembly having a peripheral fuel pump and a permanent magnet DC motor of the disk commutator type coaxially aligned within an elongated housing. The housing and a fuel level sender unit are both suspended by an outlet conduit from a tank access opening so that the peripheral pump's inlet is near and the housing's longitudinal axis is aligned with the tank bottom. The outlet conduit serves also as a ground conductor both for the motor operating circuit and for the sending unit.

---

The invention relates generally to vehicle fuel systems, and particularly to an electric fuel pump system of the kind having the fuel pump suspended in the fuel tank. The invention also concerns peripheral pumps adapted, although not exclusively, for submerged operation in a vehicle fuel tank.

For an engine driven vehicle to perform satisfactorily, its fuel system must be capable of providing an adequate supply of fluid under all operating conditions. If the system permits vapor to accumulate, flow is impaired or even stopped when the well known "vapor lock" condition occurs. This latter condition is a more pronounced problem with any system that has a pump with a suction line of any extent. Perhaps typical is a conventional system having the fuel pump in the front of the vehicle and the fuel tank in the rear. Necessarily the suction line must extend for almost the entire length of the vehicle. This vapor problem can be diminished somewhat by increasing the output pressure of the pump, but only at the risk of engine flooding since these higher pressures tend to unseat the usual carburetor float needle valve.

The long suction line problem can be avoided by mounting the fuel pump closely proximate to or preferably in the tank, but this presents numerous other problems, particularly when the fuel pump is in the tank for there is a drive problem. If the in-the-tank fuel pump is to be driven by an electric motor, the motor should be capable of operating without excessive demands on the conventional vehicle battery. Both the motor and the fuel pump must be of an acceptable size for insertion and removal through an access opening in the fuel tank, and together not so large as to require that the fuel tank be substantially increased in size.

The disposition of the fuel pump in the tank is also important. Because the typical fuel tank flexes considerably with changes in the amount of fuel it contains, dimensional control of the pump's inlet relative to the tank bottom is difficult. Then too, any significant suction lift, such as that presented by a vertical pump, interferes with stop and start pump operation. Maximum filter area exposure is desirable to facilitate filter cleaning by tank "slosh."

Other factors to be considered are the manufacturing costs of the in-the-tank fuel pump versus that of the conventional engine driven fuel pump, its overal size, and its reliability. Because electric motor driven pumps will be driven, if simplicity is to be achieved, at a relatively constant speed, except for variations from the usual voltage fluctuations, whether the engine is operated at full throttle or at closed throttle, provision must be made for these variations in the volume of fuel requirements; e.g., when no flow is required the static pressure and vapor produced by churning may be beyond acceptable limits.

With the foregoing in mind a new and different vehicle fuel system incorporating an in-the-tank fuel pump assembly is proposed that is capable of supplying an adequate amount of fuel under all operating conditions, whether supplying a high volatile fuel at a high temperature with a wide open throttle acceleration condition or during an engine idling condition and without concern for vapor accumulation or flooding; that effectively combines the functions of certain structurally simple elements so as to minimize their number; that utilizes low cost materials; that is easily assembled; and that combines the fuel pump assembly and a fuel level sender unit into a unit assembly with an outlet conduit serving each, both as a support and a common current conductor so as to facilitate quick and easy installation with a minimum revision of a present day vehicle.

Further contemplated by the invention is a novel in-the-tank electric fuel pump assembly that is of relatively small size and weight such that it can be easily suspended from a fuel tank by an outlet conduit with the assembly's longitudinal axis generally parallel to the tank bottom and with its inlet closely proximate the tank bottom so that a maximum gravity head is initially presented to facilitate quick pump priming and so that an elongated filter of a substantial area can lay along the tank bottom. Also contemplated is an electric fuel pump assembly of an unusual construction that has a disk-type commutator permanent magnet DC motor positioned within a housing, which has at one end a peripheral pump that has a floating drive connection with the motor for easy assembly and to avoid the need for close dimensional control and in the other end an axial brush assembly for the disk commutator and valving; that can accomodate substantially longer brushes for greater brush life; that minimizes bearing thrust loads; that has provisions for flow-through passage of fluid around the motor's permanent magnet and also through the motor and out the end of the housing with the brush assembly; that utilizes nonmetallic, easily moldable materials which resist corrosion, are good electric insulators, and have good bearing characteristics so that rotating parts can be journaled directly in these nonmetallic parts; and that incorporates axial and peripheral locators for part spacing and motor and brush alignment.

Additionally contemplated by the invention is a unique peripheral pump that is small in size, that is capable of operating at a relatively slow speed so as to consume a minimum of power without unduly heating and disturbing the fuel, and that can operate at a relatively high pressure but with a relatively low flow rate. Further proposed by the invention is a peripheral pump with all of its parts formed of nonmetallic and easily moldable materials, that utilizes a vaned impeller with the vanes disconnected from each other to enhance the volume of fuel pumped and randomly spaced for quiet operation, that has an impeller enclosure formed in two parts which conveniently and effectively snap together, that has an external venting arrangement that facilitates both static and dynamic purging for achieving efficient operation, and that employs unconventional dimensions that facilitate this efficient operation.

In carrying out the invention according to one embodiment thereof, the fuel pump assembly has an elongated housing with a disk commutator type DC permanent magnet motor positioned therein between a peripheral pump, with which it is coaxially aligned, and an axial brush assembly. The brush assembly end of the housing includes valving and has extending therein an outlet conduit that supports the housing and also a fuel level sending unit from an access opening in the tank. The conduit is provided with a sealing flange that surrounds the access opening and is clamped to the tank so as to suspend the assembly with the inlet to the pump closely proximate to the tank bottom and with the longitudinal axis of the assembly aligned somewhat parallel with the tank bottom. The conduit also serves as a ground conductor and is both in the motor circuit and the fuel level sending unit circuit.

Within the housing the DC motor has an annular permanent magnet that is constructed and arranged such that the main flow of fluid from the pump to the outlet conduit is between the housing and the permanent magnet. Also, the pump discharges fuel through the motor to facilitate cooling, lubrication, and the removal of dirt, which fuel is carried back to the tank via a vent in the brush assembly end of the housing.

The peripheral pump has an impeller with randomly spaced and disconnected vanes for circulating fuel between peripheral inlet and outlet ports. A vent is positioned near the root of the impeller vanes and extends to the exterior of the pump and to the tank so as to provide both static and dynamic purging. The pump has communicating with the inlet port an inlet extension of sufficient area to provide a storage for incoming fuel and on which an elongated filter is mounted.

The foregoing and other objects and advantages of the invention will become apparent from the following description and the accompanying drawings, in which:

FIGURE 4 is a longitudinal, sectional view of the fuel pump assembly;

FIGURE 5 is an end elevational view of the fuel pump assembly, looking in the direction of arrows 5—5 in FIGURE 4;

FIGURE 6 is a fragmentary, sectional view of the assembly taken along line 6—6 in FIGURE 5;

FIGURE 7 is an end elevational view of the assembly with parts broken away and in section, looking in the direction of arrows 7—7 in FIGURE 4;

FIGURE 8 is a sectional view of the assembly taken along line 8—8 in FIGURE 4;

FIGURE 9 is a schematic diagram of a control circuit for the fuel pump assembly;

Figure 1:
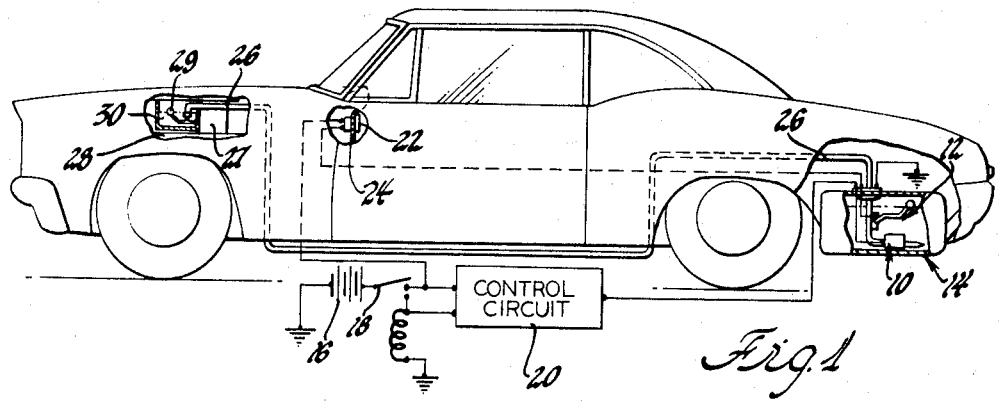
FIGURE 1 is an elevational view of a vehicle with a schematically illustrated fuel system incorporating the principles of the invention.

Referring now to the details of the drawings and first to FIGURE 1, the numerals 10 and 12 denote, respectively, an electric fuel pump assembly and a fuel level sending unit, both of which are mounted in and suspended from a vehicle fuel tank 14. Electric power derived from a battery 16, when an ignition switch 18 is closed, is supplied through a control circuit 20 to the fuel pump assembly 10. With the ignition switch 18 closed, the fuel level sender unit 12 is also connected to the battery 16 through a fuel level gauge 22, which is mounted on the vehicle's instrument panel 24. This fuel level gauge 22 is of any commercially available type that provides a visual readout of the tank fuel level; i.e., whether the level of the fuel is high or low or at some intermediate level. The fuel pump assembly 10, when operating, supplies fuel under pressure through a conduit 26 extending from the fuel tank 14 to a carburetor 27, which serves a front end mounted engine 28. The carburetor 27 can be of any usual design having a float-operated needle valve 29 that controls the fuel flow from the conduit 26 to a float chamber 30 so as to maintain a certain fuel level in the chamber 30.

Considering first the details of the fuel pump assembly 10 portrayed in FIGURE 4, the numeral 32 designates a cylindrical housing that is, for a reason to be explained, made of a magnetic material such as steel and is treated; e.g., by zinc plating, so as to be relatively immune to the corrosive effects of the fuel. Positioned within the housing 32 and between the ends is a DC motor, designated generally at 34. In the inlet end of the housing 32 and against a shoulder 36 is positioned a peripheral pump 38. In the opopsite end of the housing 32 or the outlet end an end cover 40 with a brush assembly 42, depicted in FIGURE 6, is installed. The peripheral pump 38, the DC motor 34 and the end cover 40 are inserted within the housing 32 sequentially so that they are coaxially aligned and in the illustrated side by side relationship. Then an end 44 of the housing 32 is mechanically rolled or otherwise deformed to maintain the placements. For exemplary purposes, this assembly 10 has an approximate diameter of 1¼ inches and is about 3¼ inches in overall length.

The peripheral pump 38 comprises a cylindrical casing 46 and a cover 48, both preferably formed of a nonmetallic, easily moldable synthetic resin material that can withstand the corrosive effects of the fuel but still offer the strength and durability needed for a vehicle fuel pump. A fiber glass reinforced acetal resin has been found suitable. As viewed in FIGURES 4 and 8, the casing 46 and the cover 48 have at their periphery circumferentially spaced finger and slot locators 50 and 52. In this embodiment the casing 46 has the fingers 50 laterally extending therefrom and the cover 48 has the slots 52. This, of course, could be reversed. These slots 52 are on a slightly larger outside diameter than the inside diameter of the fingers 50 so that there is an interference fit for retaining the casing 46 and the cover 48 together. With the suggested material and this interference fit, the casing 46 and the cover 48 actually snap together when assembled. Also, one of the finger and slot locators, such as that shown at 53, is larger so that the cover 48 can be properly aligned always in the same way relative to the casing 46. The casing 46 and the cover 48 together respectively have confronting spaced apart lateral surfaces or annular lands 54 and 56 and outwardly extending annular channels 58 and 60. The casing 46 has an inlet port 62 shown in FIGURES 4, 7 and 8, communicating with its annular channel 58, while the cover 48 has an outlet port 64, also shown in FIGURES 4, 7 and 8, communicating with its annular channel 60. These ports 62 and 64 are separated from each other by side stripper abutments 66 and 68, respectively, in the casing 46 and the cover 48, and a peripheral stripper abutment 70 in the casing 46. As depicted in FIGURE 4, the side stripper abutments 66 and 68 are extensions of the annular lands 54 and 56, respectively, and therefore are spaced apart the same lateral distance to effect fluid isolation or a seal between the inlet and outlet ports 62 and 64 during operation of the pump 38.

With the suggested material the casing 46 itself performs as a bearing, which is the function of a center bearing bore 72 that terminates in a conical-shaped bearing seat 74. This bore 72 provides a journal support for the end of an armature shaft 76, and thus avoids the need for a separate space consuming bearing. The bearing seat 74 includes a bleed hole 78, which exhausts to the tank 14 leakage fuel that passes between the armature shaft end and the bore 72 so as to avoid any excessive pressure buildup. This leakage fuel affords both bearing cleansing and bearing lubrication.

Figure 2:
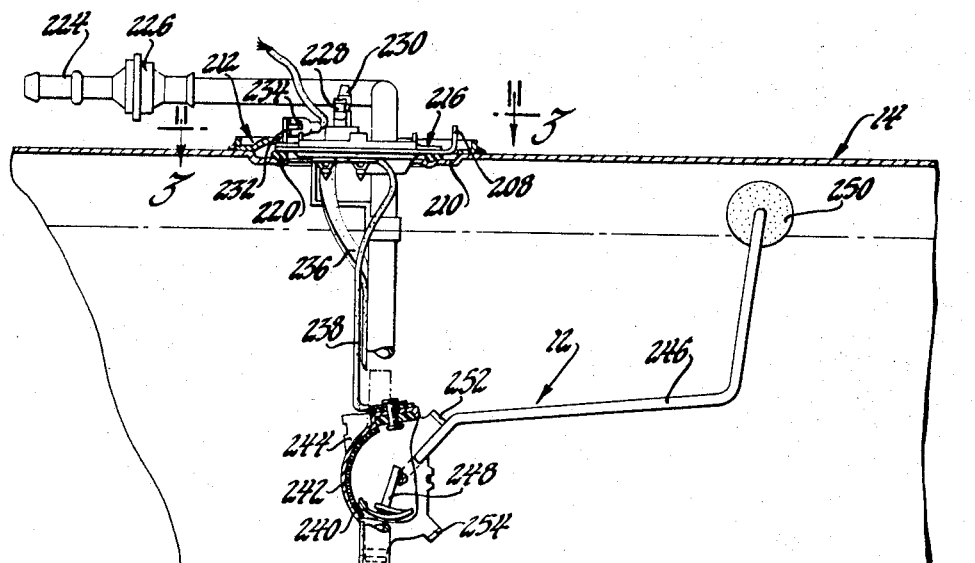
FIGURE 2 is an enlarged fragmentary view of the FIGURE 1 system's in-the-tank fuel pump assembly.

The casing 46 also includes a tubular-shaped extension 80, which communicates with the inlet port 62 and which provides an inlet storage area for the incoming fuel. This inlet storage facilitates the continuous supply of fuel to the pump 38 during cornering and acceleration and also serves as a mounting for an elongated filter element 82, depicted in FIGURE 2. This filter element 82 is preferably made of a mesh-like material commercially available under the trade name "Saran" and can have a length of six inches or more to provide subsequently to be discussed advantages. The filter element 82 may be held in place on the tabular extension 80 by a C-type clamping device 84, also shown in FIGURE 2.

The casing 46 has a vent 86, which as illustrated in FIGURE 7 is approximately diametrically opposite the inlet port 62 and is at the bottom of the annular channel 58. This vent 86 extends, as seen in FIGURE 4, to the exterior of the casing 46 and, as will be explained, provides both static and dynamic vapor purging.

The cover 48 has a central opening 88 surrounded by a tabular outlet extension 90 that directs fluid both through and around the motor 34. At its outer periphery the cover 48 has a series of circumferentially spaced, axially extending spacer fingers 92 for axially positioning the pump 38 and the DC motor 34 within the housing 32. These fingers 92 can be observed in FIGURES 4 and 8.

Revolvably positioned within the raceway formed between the casing and cover annular lands 54 and 56 is an impeller 94, which may be made of the same material as the casing 46 and the cover 48, or if preferred can be made of an easily die cast metal such as aluminum. The impeller 94, as viewed in FIGURES 4 and 7, includes a hub 96 that has substantially the same outer diameter as the inner diameter of the annular lands 54 and 56. From the hub 96 and radially extending outwardly therefrom are a series of vanes 98 which have random but carefully selected variable spacing and which are disconnected from each other so that cross flow of fuel can take place between the individual vanes 98 and, therefore, a greater volume of fuel can be pumped. This random disposition of the vanes considerably reduces the noise generated by the pump 38 because the noises emanating from the random-spaced vanes 98 are not all the same and, hence, do not tend to amplify each other. If the vanes 98 are equispaced, each emits substantially the same sound and the cumulative effect is objectionable.

The impeller hub 96 has a center opening 100 with slightly rounded or tapered edges for easy insertion of the end of the armature shaft 76 and a series of slots 102 spaced as shown in FIGURES 7 and 8, about the opening 100 for reception of a driver element 104 affixed to the armature shaft 76. This arrangement provides a floating connection that facilitates the interconnection of the end of the armature shaft 76 with the impeller 94 during assembly and also allows some wobble and axial movement of the impeller 94 to adjust to any slight variations that may result from the usual manufacturing tolerances. Close dimensional control is consequently not a necessity.

The driver element 104 is preferably formed of a suitable synthetic resin material that enables it to be easily press-fitted onto the shaft 76.

Without limitation, relatively unconventional pump dimensions are suggested that have produced very satisfactory results with a 1.125 inch diameter impeller having a .170 inch width. The depth of the impeller vanes 98 to obtain as much volume as possible is between 35% and 40% of the radius of the impeller 94. The radial clearance, denoted by the numeral 106 in FIGURES 4 and 8, which is between the peripheral edge of the vanes 98 and the peripheral stripper abutment 70, is suggested as between .4% and .9% of the diameter of the impeller 94. The radial clearance, designated by the numeral 108 in FIGURES 4 and 8, which is between the peripheral edge of the vanes 98 and the outer diameter of the annular channels 58 and 60, is between 3% and 4% of the diameter of the impeller 94. The lateral clearance, designated by the numeral 110, between the vanes 98 and the sides of the annular channels 58 and 60 is between 25% and 35% of the lateral extent or width of the vanes 98. Suggested vane proportions are a vane depth or height that is 35% to 40% of the radius of the impeller 94 and a lateral extent or width that is between 70% and 90% of the vane depth. The pump vent 86 has a cross-sectional area that is approximately 5% of the cross-sectional area of the outlet port 64.

With these dimensions the peripheral pump 38, when driven between 4,100 and 4,800 r.p.m., will supply forty-five gallons of fuel per hour at a pressure of approximately 2 p.s.i. The static or no-flow output pressure is between 6 and 7.5 p.s.i. The dynamic pressure is 2 p.s.i. minimum and between 5 and 6 p.s.i. at 70 m.p.h. road loads. These values assume a normal system voltage, such as 13.5 volts in the usual vehicle system.

In operation, the peripheral pump's impeller 94 in passing over the inlet port 62 creates a suction that initiates fuel flow into the spaces between impeller vanes 98 from the inlet tubular extension 80. Then due to centrifugal force the fuel is moved outwardly into the annular peripheral channel 108. The continuing force thereon causes the fuel to move into side channels 58 and 60 (inwardly toward the impeller hub) at the same time advancing in the direction of the impeller 94 but more slowly. It competes successfully with other fuel to re-enter the space between the impeller vanes 98 where centrifugal force again increases the energy of this fuel. Since the fuel is retained by the relatively close fits, it recirculates and spirals around the impeller 94. As the impeller 94 continues to rotate, the fuel is acted upon several times and, therefore, acquires more energy than would be imparted to it by an equivalent size centrifugal pump. This results in a desired greater pressure but less flow advantage over a centrifugal pump. Due to this increased energy or the so-called regenerative or cumulative effect, the fuel has its pressure progressively and continuously increased as it proceeds from the inlet port 62 to the outlet port 64. Any significant flow beyond the outlet port 64 and back to the inlet port 62 is inhibited by the close fits between the impeller 94 and the peripheral abutment 70 and the side stripper abutments 66 and 68. These stripper abutments thus effectively provide a seal therebetween for the required pump action. The closeness of these fits contributes to the pump characteristics particularly its pressure increase at restricted flows.

The pump vent 86 serves two purposes during this pump operation. In describing these purposes it should be kept in mind that vaporized fuel within the pump annular channels 58 and 60 will interfere with and possibly block the inflow of fuel. Also, the vent 86 is positioned as illustrated in FIGURE 7 at the top of the pump; i.e., top relative to the inlet port 62, which would be positioned closely proximate the bottom of the fuel tank 14, or as has been described the vent 86 is located substantially diametrically opposite to the inlet port 62 and at the root or base of the impeller vanes 98. In this position of the vent 86 the less dense vaporized fuel which tends to accumulate near the axis of the impeller 94 or at the root or base of the vanes 98 is quickly exhausted out the vent 86 to the tank 14, and with a minimum loss of liquid.

Considering the first purpose for the vent 86; namely static purging, even when the pump 38 is inoperative, vaporized fuel can still accumulate in the annular chambers 58 and 60 and will block the entrance of solid fuel so that pump operation cannot commence. The vent 86 exhausts this vaporized fuel so as to allow the pump 38 to prime or to wet itself; i.e., the solid fuel can enter the submerged pump 38 prior to and after commencing operation.

The other purpose of the vent 86 is for dynamic purging. With the pump impeller 94 being revolved at its operative speed there is, as mentioned, a centrifuging of the fuel which causes the less dense vaporized fuel to accumulate at the center of the pump 38 or in the area of the roots or base of the vanes 98. If any appreciable accumulation is permitted, the pump capacity will be correspondingly reduced because the area provided for solid fuel flow diminishes. The vent 86 exhausts this vaporized fuel directly back to the tank 14 and avoids this problem. This dynamic purging is particularly effective when there is no flow and the pump 38 builds up to its static pressure, 6 to 7.5 p.s.i. When there is no flow, a continuous churning results and this develops vapor which must be eliminated or adequate flow will not occur when wanted.

Relative to this static and dynamic purging, the direct exhaust to the fuel tank 14 and not, for example, to the pump outlet keeps the vapor from getting into the system, where it could cause as much trouble in the carburetor as in the pump. Desirably, potential vapor-produced problems are avoided.

Continuing to refer to FIGURE 4, the DC motor 34 is preferably operable with the conventional 12-volt vehicle ignition system. The motor 34 includes a two-pole, annular permanent magnet 112 that has a peripheral sliding fit with the housing 32 and engages the tubular outlet extension 90 on the pump cover 48. The housing being, as mentioned, made of a magnetic material is a flux carrier and thus provides a low reluctance return flux path for the magnet 112. In the periphery of the permanent magnet 112 is a series of axially extending slots 114 that provide fluid passages for the fuel from the outlet port 64 in the peripheral pump 38. As has been briefly discussed, the tubular outlet extension 90 defines an outer annular chamber, which has been assigned the numeral 116 and into which the fuel from the outlet port 64 is discharged. This fuel in the annular chamber 116 then proceeds to the slots 114.

One of these slots, such as slot 118, is made of somewhat larger width for circumferentially positioning the permanent magnet 112 relative both to the pump 38 and the brush assembly 42. During assembly, similar axially extending fingers 120 and 122, respectively on the pump cover 48 and the end cover 40, mate with the single slot 118 to provide this circumferential alignment. In this FIGURE 4 embodiment the permanent magnet 112 has its circumferential polar alignment established both with respect to the tubular inlet extension 80, which is to be at the bottom of the fuel tank 14, and the brush assembly 42 so that proper commutation occurs during the motor operation.

The motor 34 also includes an armature 124 and a disk commutator 126, both of which are affixed to the armature shaft 76. The disk commutator end of the shaft 76 is journaled within a center bearing bore 128 in the end cover 40 in much the same way as the impeller drive end is journaled within the pump casing bore 72. The bore 128 is of a polygonal shape; e.g., hexagonal, so as to permit fuel flow into the resultant spaces for bearing lubrication and cleansing, as will be further explained.

Referring now to FIGURE 6, the brush assembly 42 has two brush sets, each including an external terminal 130, a coil spring 132 and a cylindrical, elongated brush 134, all aligned within an axial opening 136 in the end cover 40. Preferably, in the vicinity of the brushes 134 the axial openings 136 have a polygonal shape, such as the illustrated hexagonal configuration, to permit fuel flow therearound for lubrication and cleaning purposes as with bearing bore 128. The springs 132 have a dual function. They are made of a conductive material so that they electrically connect the terminals 130 to the brushes 134, and they also urge the brushes 134 into contact with the disk commutator 126. It should be kept in mind that the permanent magnet's magnetic field has a self-centering influence on the armature 124 and, therefore, the pressure exerted on the brushes 134 by the springs 132 will be opposed by this self-centering force and this provides proper brush contact pressure without substantial thrust loads being imposed upon the conical-shaped seat 74 in the pump casing 46. Of course, adjustment may be required so that the armature 124 is offset laterally slightly to partially counteract the brush forces.

In discussing FIGURE 4 it was mentioned that the pump cover tubular outlet extension 90 directs fuel through the DC motor 34. There is permitted a continuous leakage of fuel from the pump annular chambers 58 and 60 into the area of the impeller hub 96. This leakage path further facilitates vapor purging since, as explained, vapor is continually forced towards this area by the greater density of the solid fuel in the pump 38. Fuel following this leakage path is advantageously directed by the extension 90 through the center opening in the permanent magnet 112 and around the motor armature 124 so as to provide motor cooling. Additionally, this leakage fuel flows around the commutator 126, particularly in the area in engagement with the brushes 134, and also into the spaces between the brushes 134 and the hexagonal-shaped cover axial openings 136 and the center bearing bore 128 to provide the mentioned lubrication and cleansing by washing away dirt as well as the particles eroded from the brushes 134. This fuel flowing through the DC motor 34 is then exhausted through a vent 138 in the end cover 40 and back to the tank 14.

By having the commutator end of the armature shaft 76 journaled directly within an end cover 40, it can be appreciated by inspecting FIGURE 6 that the brushes 134 can be placed diametrically opposite each other and much closer to the axis of rotation of the disk commutator 126 so as to reduce the relative speed therebetween and, accordingly, the wear. If a separate bearing were required, then the diametral space required for the bearing would require that these brushes 134 be moved radially outwardly further and subject them to a faster relative speed. Furthermore, the disk commutator 126 being flat is easily automatically connected during the winding of the armature 124 so as to reduce cost and it also permits the use of relatively long brushes and springs for longer brush life. Then too, the armature shaft 76 is preferably made of magnetic stainless steel to improve the magnetic properties of the armature and to obtain good bearing action in the end cover 40 and the pump casing 46.

The fuel in the passages provided by the permanent magnet slots 114 is directed by a tubular extension 140 on the end cover 40 to an outlet passage 142. This tubular extension 140 additionally affords an axial locator for the end cover 40 relative to the permanent magnet 112 and also isolates the fuel flowing through the DC motor 34 from the fuel flowing through the permanent magnet slots 114.

The end cover 40 has installed in the outlet passage 142 a check valve 144 for preventing reverse flow; i.e., flow from the passage 142 back to the peripheral pump 38. The check valve 144 can, as will be discussed, be located outside the fuel tank 14. The check valve 144 has a body 146 of a resilient material formed so as to be deflected when the body 146 is forced into the large end of the outlet passage 142 and thus provide a gripping type press fit. The body 146 can, if required, be slotted in the usual way to facilitate greater deflecting. An annular valve seat 152 having a center opening 154 is retained by the body 146 in the depicted FIGURE 4 position. A spring 156 urges a valve plate 158 against the annular valve seat 152 so as to close the opening 154. When the fuel under pressure acts against the valve plate 158, the bias from the spring 156 is overcome and the valve plate 158 moves off the annular valve seat 152 so that flow therethrough can take place. If the flow of fuel tends to proceed in the opposite direction and toward the peripheral pump 38, this backflow pressure plus the bias from the spring 156 will return the valve plate 158 to the closed position and prevent this backflow.

To insure that the pressure, and particularly the static pressure, from the peripheral pump 38 does not become excessive during the times when there is little or no flow so as to unseat the float needle valve 29 in the carburetor 27 and produce flooding, a pressure relief valve denoted generally at 160 is installed in the end cover 40 so as to be in communication with the outlet passage 142 downstream from the check valve 144. The pressure relief valve 160 includes a stepped passage 162 interconnecting the outlet passage 142 to the outside of the end cover 40. Movably positioned within the stepped passage 162 is a valve element 164 that engages a valve seat 166 at the juncture of the steps in the passage 162. A spring 168 is held in place by a retainer plate 170 and urges the valve element 164 against the valve seat 166. The retainer plate 170 has a central opening 172 for fuel flow therethrough. Also, the end cover vent 138 exhausts into the stepped passage 162 downstream of the valve element 164.

Operationally, if the pump static condition exists and there is a relatively slight fuel flow, the static pressure in the outlet passage 142 will commence to rise, e.g., to about 7.5 p.s.i. The valve element 164 is adjusted for this value so as to unseat for pressure relief. Fuel will then be discharged by way of the opening 172 in the retainer plate 170 back to the fuel tank 14 to insure that the static pressure does not exceed 7.5 p.s.i.

Figure 10:
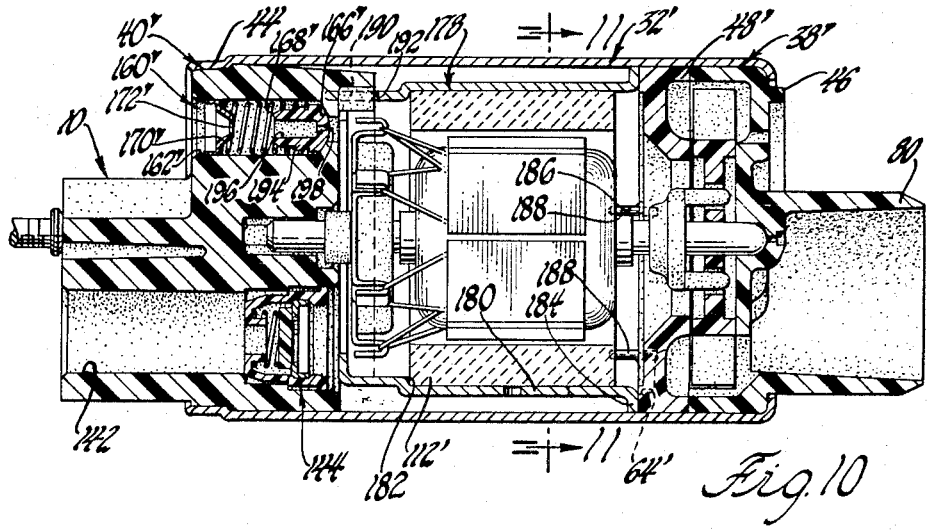
FIGURE 10 is a longitudinal, sectional view of a modification of the fuel pump assembly.
Figure 11:
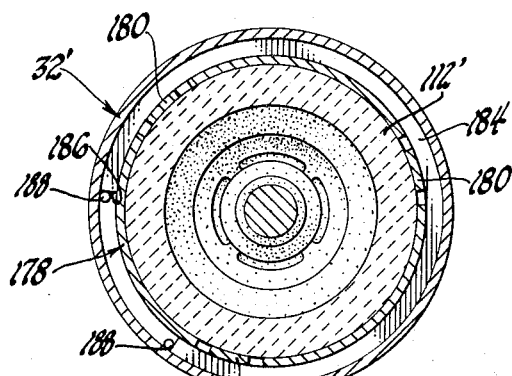
FIGURE 11 is a sectional view of the modified fuel pump assembly taken along line 11—11 of FIGURE 10.
Figure 12:
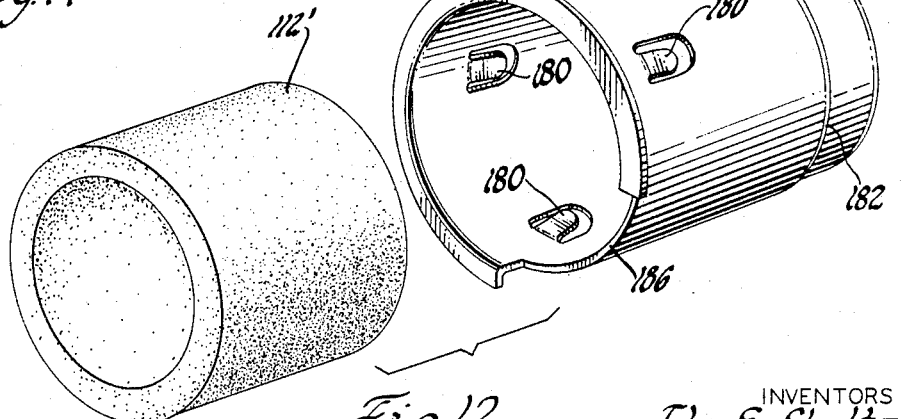
FIGURE 12 is an exploded view of the FIGURE 10 modified fuel pump assembly's permanent magnet and a sleeve which fits thereon.

The modified fuel pump assembly depicted in FIGURES 10–12, inclusive, incorporates variations that may be used in the FIGURE 4 embodiment individually or in combination, as will be understood by those versed in the art. To avoid duplication those parts in the FIGURE 10 embodiment that are the same as the parts in the FIGURE 4 embodiment have been assigned the same numerals. Similar parts have the same numeral but with a prime (') added to the numeral.

In the FIGURE 10 embodiment the housing 32', unlike that in the FIGURE 4 embodiment, is made of a nonmagnetic, conductive material such as aluminum since it is no longer employed as a flux carrier. With aluminum as a material, the magnetic forming process can be used to close housing end 44. The permanent magnet, now assigned the numeral 112', does not have the fuel passage slots 114 in the periphery but has a smaller outer diameter, and has installed thereon a sleeve 178 made of a magnetic material, e.g., a good grade of steel, so as to serve as a return path for the flux from the permanent magnet 112' and also to concentrically align the permanent magnet 112' within the housing 32', and to define a fluid passage from pump 38 to the end cover 40.

As viewed in FIGURE 12, the permanent magnet 112' is inserted within the sleeve 178 and the inwardly extending locking tabs 180 engage the surface of the permanent magnet 112' so as to retain the permanent magnet 112' in position against a shoulder 182. The sleeve 178, also as seen in FIGURE 12, has a supporting flange 184 that is dimensioned so as to provide a sliding engagement with the interior of the housing 32 while providing concentric alignment of the permanent magnet 112' with the inner diameter of the housing 32'. The supporting flange 184 has a slot 186 which affords a fluid passage and also facilitates the location of the sleeve 178 and the permanent magnet 112' relative to the pump 38'.

For the foregoing discussed circumferential positioning of the permanent magnet 112', both relative to the end cover 40' and the pump 38', the pump cover 48' has, as depicted in FIGURE 11, a pair of locating pins 188 axially extending therefrom and spaced so as to engage the edges of the slot 186. The circumferential location of the end cover 40' relative to the permanent magnet 112' is established by a locator pin 190 (see FIGURE 10) which is secured to the end cover 40' and which is adapted to engage an end locating recess 192 in the sleeve 178. This end locating recess 192 is illustrated in FIGURE 12.

The other modification incorporated in the FIGURE 10 embodiment relates to the valving in the end cover 40'. The check valve 144 can still be employed in the outlet passage 142, but a different pressure relief valve 160' is used and one that combines the functions of the FIGURE 4 pressure relief valve 160 and the vent 138. As illustrated, the pressure relief valve 160' includes a retainer plate 170' with a central opening 172' and a spring 168', all of which are installed within a stepped passage 162' having a valve seat 166'. A valve element 194 is urged by the spring 168' to the illustrated closed position against the valve seat 166' to block fuel flow around the seat 166'. The valve element 194 has a central through passage 196 with a restriction 198 that performs as a vent and thus has the same function as the vent 138 in the FIGURE 4 embodiment. With the valve element 194 in the illustrated position, the fuel that passes through the DC motor 34 is continuously exhausted through this restriction 198. But if the pressure in the system should rise beyond the set value for the pressure relief valve 160', the valve element 194 will unseat to offer pressure relief.

Functionally, the fuel pump assembly 10' in FIGURE 10 operates substantially the same as the fuel pump assembly 10 in FIGURE 4. Fuel proceeding from the outlet port 64', which will be appropriately altered so as to discharge into the area defined by the slot 186 in the sleeve 178, will then proceed by the annular passage between the sleeve 178 and the housing 32' to the outlet passage 142, of course by way of the check valve 144. The fuel follows the same pathway through the DC motor 34 and then via the restriction 178 in the valve element 194 back to the fuel tank 14. If, as just explained, the fuel pressure becomes excessive the pressure relief valve 160' becomes operative.

Figure 13:
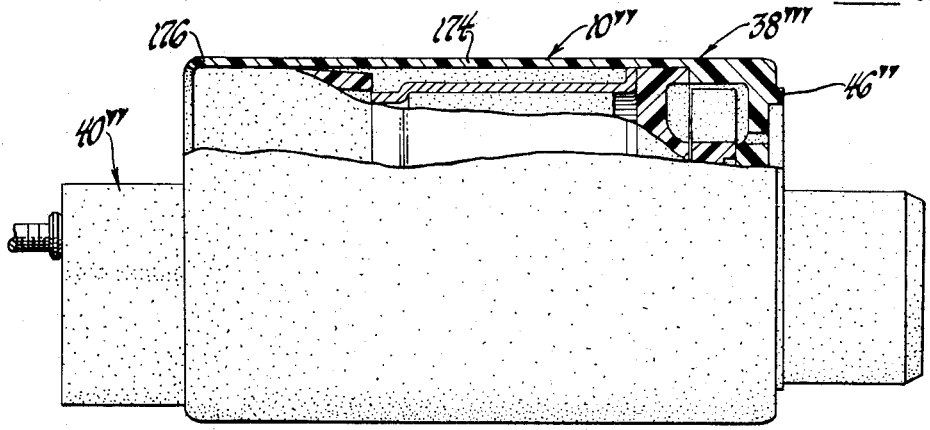
FIGURE 13 is a fragmentary side elevational view, partly in section, of another modification of the fuel pump assembly.

It has been discussed in the description of the FIGURE 4 embodiment that the pump casing 46 and cover 48 and the end cover 40 are made of a suitable or synthetic resin material that is easily moldable and able to operate in an environment such as the fuel tank of a vehicle. In the FIGURE 13 embodiment a separate cylindrical housing 32 is not employed, but instead the assembly 10'', has a pump casing 46'' with an axially extending housing end 174 that is appropriately connected at 176 to the end cover 40'', for instance by friction welding, so as to maintain the assembly parts in place. If preferred, the end cover 40'' instead of the casing 46'' could be formed with the extension and friction welded at its end to the FIGURE 4 type of pump casing 46. The choice, of course, will be determined by requirements of the assembly and possibly various economic considerations.

Figure 14:
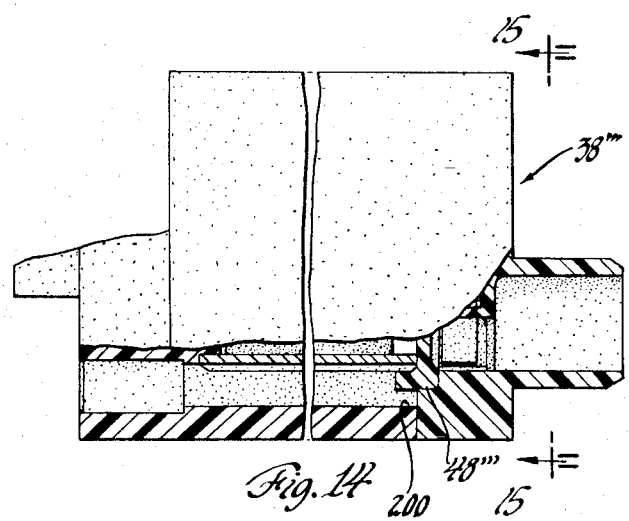
FIGURE 14 is a side elevational view, partly in section, of a further modification of the fuel pump assembly.
Figure 15:
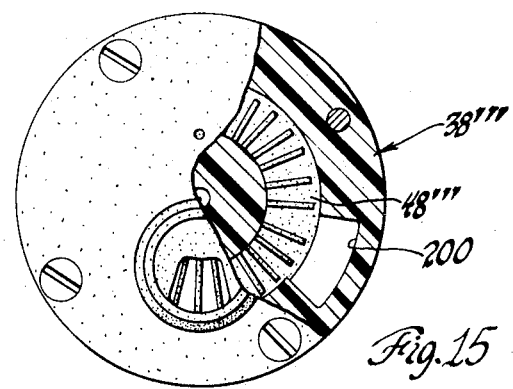
FIGURE 15 is an end elevational view, with parts broken away and in section, of the FIGURE 14 modified assembly, looking in the direction of arrows 15—15.

In FIGURES 14 and 15 the modified fuel pump assembly has been assigned the numeral 10'''. This assembly 10''' has a peripheral pump 38''' altered so as to have a radially offset outlet port 200 in the cover 48'''. The contour of this port is illustrated in FIGURE 15. The pump casing 46''' is correspondingly contoured. This radial offset permits a greater volume of fuel to be pumped and can be incorporated in any of the FIGURES 4, 10 or 13 embodiments.

Referring again to FIGURE 2, the in-tank installation and its structure will be described. Any one of the fuel pump assemblies illustrated in FIGURES 4, 10, 13 and 14 may be used, but for explanatory purposes the fuel pump assembly 10 in FIGURE 4 will be assumed. The pump's inlet extension 80 will have installed thereon the elongated filter 82, and this filter 82 will, as mentioned, be held in place by the C-clamp 84. This elongated filter 82 actually lies on the bottom of the tank 14 and presents, as can be appreciated, a substantial area which is continuously cleansed by the moving fuel in the tank 14. A discharge or outlet conduit 202 having a tapered end at 204 is inserted into the outlet passageway 142 in the end cover 40. This taper precludes the need for a separate seal. The conduit 202 is formed of a conductive material, such as steel, and has in this embodiment a .375 inch outside diameter. A support element 206, welded or otherwise attached to the end 204, is connected to one of the brush external terminals 130, which is to serve as a ground by a suitable nut or the like. This connection holds the tapered end 204 in place in the outlet passage 142 and also electrically interconnects the one external terminal 130 with the conductive outlet conduit 202.

Figure 3:
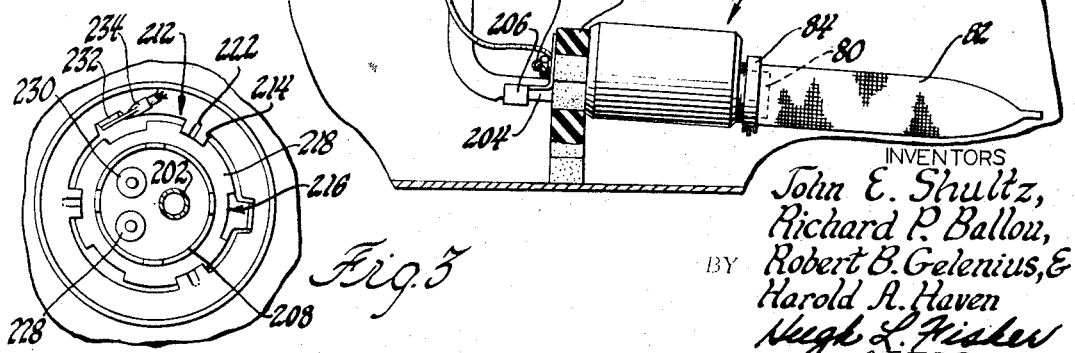
FIGURE 3 is a view, looking in the direction of arrows 3—3 in FIGURE 2, of an access opening to the fuel tank and cover structure therefor.

The opposite end of the outlet conduit 202 has affixed thereto an annular mounting flange 208 which covers an access opening 210 in the top of the fuel tank 14. This access opening 210 can be elsewhere; i.e., in the side or bottom of the fuel tank 14. The size of the access opening 210 is selected so that the assembly 10 can be easily inserted into the tank 14. Surrounding the access opening 210 and attached to the outside of the fuel tank 14 is a ring 212 having three inwardly extending fingers 214, illustrated in FIGURE 3. An annular cam 216 has locking ridges 218 that ride under the fingers 214 so as to compress an annular resilient seal ring 220 between the fuel tank 14 and the mounting flange 208. Small depressions 222 in the fingers 214 coact with corresponding parts of the ridges 218 to provide a releasable lock so as to maintain the position of the cam 216 relative to the ring 212. The outlet conduit 202 extends to the exterior of the fuel tank 14 and has provision at 224 for connection to the conduit 26 from the carburetor 28.

The check valve 144, which in the FIGURES 4, 10, 13 and 14 embodiments is in the outlet passage 142, may alternatively, as has been mentioned, be installed in the outlet conduit 202, such as at 226 adjacent the end 224.

The mounting flange 208 has extending to the external side thereof a power terminal 228, a gauge terminal 230 and a ground terminal 232. The ground terminal 232 is connected by a conductor 234 to the vehicle frame (not shown). The power terminal 228 is connected to the control circuit 20 and the gauge terminal 230 is connected to the fuel level gauge 22. Inside the tank 14 the power terminal 228 is connected by a conductor 236 to the other of the external brush terminals 130, and the gauge terminal 230 is connected by a conductor 238 to a resistance element 240 for the sender unit 12.

The resistance element 240 is attached to and electrically isolated from a casing 242 which is suitably clampingly connected to a semilar shaped cover 244 secured to the outlet conduit 202. The casing 242 revolvably supports a float arm 246 that has a contact 248 secured thereto so as to be in engagement with the resistance element 240. The other end of the float arm 246 has a cylindrical float 250 of a size and material, such as wood, which will float in the fuel. As the float 250 lowers or raises with the level of the fuel in the tank 14 the float arm 246 will rotate and, accordingly, the contact 248 will be moved relative to the resistance element 240 between full and empty stops 252 and 254 formed on the sender unit cover 244. The contact 248 is connected through the cover 244 with the outlet conduit 202 so as to be grounded therethrough.

The operation of the sender unit 12 will be briefly reviewed while referring again to FIGURE 1. With the ignition switch 18 closed there is a completed circuit from the battery 16 through the guage 22, the gauge terminal 230, its conductor 238, the resistance element 240, the contact 248, the float arm 246, the cover 244, the conduit 202, the ground terminal 232, the conductor 234, and back to the battery 16 via the vehicle frame. If the cylindrical float 250 is in the illustrated fuel position, the resistance in series with the gauge 22 will be maximum and the fuel level gauge 22 will be calibrated to indicate a fuel tank full condition. If the opposite condition exists; i.e., the float arm 246 is against the empty stop 254, the contact 248 will be closer to the end of the resistance 240 connected to the conductor 238 and there will be a minimum resistance in series with the gauge 22. Accordingly, the gauge 22 will reflect an empty fuel tank condition.

Installation of the fuel pump assembly 10 is made so that the filter 82 and the inlet extension 80 for the fuel pump 38 are in a position either within a well (not shown) within the tank 14 if such is needed or are as close to the bottom of the tank 14 as possible to insure that when the fuel level is low and the vehicle is accelerated the acceleration forces do not cause the fuel to flow away from the inlet extension 80. Also, the suction lift is minimum; i.e., the vertical distance fuel must be raised to reach the pump 38. However, except when the tank is almost entirely empty, there is fuel at or above the pump level resulting in a position suction head. This feature enables the pump 38 to be stopped and started without a priming problem as would be encountered with a vertically arranged pump.

Because the bottom of the fuel tank 14 will flex, determined by the amount of fuel in the tank 14, a fuel tank suspended assembly may be in engagement with the bottom with one fuel level condition and not another. For this reason a bumper 256 of a resilient material, such as rubber, is positioned on the end cover 40 and extends downwardly into engagement with the fuel tank bottom so as to inhibit any vibrations that might be transferred to the fuel pump assembly 10. The installation of the assembly 10 is made by suspending it from the fuel tank 14 so as to be just out of physical engagement with the tank bottom when the tank 14 is empty. At this time the bumper 256 is initially compressed or preloaded. Then as the tank bottom moves downwardly as the tank 14 is filled, the bumper 256 preload is relieved but the bumper 256 still maintains contact with the tank bottom. Not only does the bumper vibrationally insulate the assembly 10 from the tank bottom but also the bumper 256 prevents the tank bottom from striking and breaking the assembly when the tank bottom is deflected by flying rocks or other roadway obstacles.

Summarizing now the operation of the entire system including the electrical control circuit 20, reference will be made to FIGURE 9 in which the control circuit 20 is shown in detail. Before describing the circuit 20 it is mentioned that the circuit 20 includes a pressure switch 258 having normally closed contacts 260 and normally open contacts 262. The pressure switch 258 is connected in a well known way to the engine lubricant system so as to respond to its pressure. Thus, when the engine is started and this lubricant acquires a certain pressure, the pressure switch 258 will be moved from the illustrated position to the broken line position and into engagement with the normally open contacts 262.

Considering the first operating condition with the ignition switch 18 in the ON position and in engagement with an ON contact 264 and the engine not running, a resistance path for current is established from the vehicle battery 16 through an instrument panel mounted indicator lamp 266, the normally closed contacts 260 (the pressure switch 258 will be in the demonstrated solid line position), and a starter solenoid coil 268 to ground. The DC motor 34 is at this time in effect at ground potential (because of the low resistance of the starter solenoid) and will not operate. Even if the pressure switch 258 malfunctions and this low resistance path is open, the pump 38 will not operate. This is because the indicator lamp 266 with a twelve-volt battery is selected to only draw .25 ampere, which is inadequate to start the DC motor 34 operating.

Next, the ignition switch 18 is moved to the START position in engagement with the START contact 270. The DC motor 34 and the starter solenoid coil 268 will be connected in parallel, the connection of the DC motor 34 to the battery 16 being by way of the normally closed contacts 260 for the pressure switch 258. Consequently, the potential of the battery 16 will be applied both across the starter solenoid coil 268 and the DC motor 34 and each will be energized. The DC motor 34 will drive the peripheral pump 38 and fuel will be supplied to the carburetor 27 during engine cranking. Once the engine 28 has started operating and the ignition switch 18 is returned to the ON position and in engagement with the ON contact 264, the battery 16 will be connected to the DC motor 34 by way of the pressure switch's normally open contacts 262, which as mentioned will be closed when the engine 28 is running. The indicator lamp 266 is effectively shunted since there is no difference of potential across the lamp 266. The now-driven peripheral pump 38 will draw fuel from the fuel tank 14 into annular chambers 58 and 60 by way of the inlet port 62 and discharge fuel both through the DC motor 34 and by way of the passages between the permanent magnet 112 and the housing 32 to the end cover 40, and via its outlet passage 142 to the outlet conduit 202, and then to the carburetor 28.

If for some reason there is a malfunction of the engine and it stops, the ignition switch 18 will of course remain in its ON position and in engagement with the ON contact 264. The reduction in the engine lubricant pressure will cause the pressure switch 258 to return to the full line position in which the normally closed contacts 260 are again closed. This, as was explained, connects the indicator lamp and fuel pump feed line to ground through the low resistance of the starter solenoid coil 268 and, therefore, the DC motor 34 is deenergized. The indicator lamp 266 will illuminate to provide a visual warning of this latter condition.

From the foregoing it will be understood that the DC motor 34 does not operate unless the engine is being cranked or the engine is running.

It will now be appreciated that a vehicle fuel system is provided that can meet the commercial requirements of compactness, simplicity and reliability. Also, the system is relatively inexpensive and incorporates features that facilitate assembly and disassembly. The compactness of the fuel pump assembly 10 and the flow-through arrangement as well as the mode of venting both for static and dynamic purging provides efficient operation regardless of fuel flow requirements. The peripheral pump 38 operates efficiently to supply an adequate volume of fuel at the appropriate pressure for optimum engine operation without the usual concern for vapor lock. The system combines the functions of the various parts, such as the conduit 202 serving both as a medium for supplying fuel to the carburetor and also as a ground conductor, and DC motor 34 itself provides a flow-through passage for fuel. The fuel flowing through the DC motor 34 serves lubrication, cooling and cleaning functions for the assembly. Then too, the selection and orientation of parts eliminates the need for bearings for the armature shaft.

The invention is to be limited only by the following claims.

What is claimed is:

1. In an engine driven vehicle fuel system of the type having an in-the-fuel-tank electric motor operated fuel pump, the combination of a fuel pump assembly adapted to be insertable through an access opening in the fuel tank, the fuel pump assembly including housing means having therein a motor and on opposite sides of the motor inlet and outlet ends respectively including therein a peripheral pump driven by and coaxial with the motor and an axial brush assembly for the motor, the inlet and outlet ends having respectively inlet and outlet passages therein, the motor including an annular permanent field magnet mounted within the housing means coaxial with the peripheral pump, an armature shaft, an armature secured to the shaft and positioned within the field of the magnet for motor operation, the armature shaft having one end drive connected to the peripheral pump and the other end provided with a disk commutator, fluid passage means for transferring fluid from the peripheral pump between the interior of the housing and the exterior of the field magnet to the outlet passage in the outlet end, the brush assembly including a plurality of brushes each mounted in the outlet end for engagement with the motor disk commutator and each having a brush terminal, and a fluid conduit formed of conductive material for suspending the fuel pump assembly from the tank so that the peripheral pump inlet passage is closely proximate the tank bottom and the rotational axes of the motor and the peripheral pump are substantially parallel to the tank bottom, the conduit having one end in fluid communication with the outlet end outlet passage and having a support element thereon connected to one of the brush terminals so as to connect the fuel pump assembly to the conduit for support thereon and also to electrically connect the conduit to the one brush terminal, the conduit having a mounting flange on the other end thereof arranged to sealingly cover the access opening and be releasably connected to the fuel tank, the mounting flange having a pair of terminals, one terminal being electrically connected to the other of the brush terminals and the other terminal being electrically connected to the conduit, a voltage source, control circuit means for connecting the voltage source to the terminals so as to energize the motor, the control circuit means being operative in response to a certain engine malfunction to deenergize the motor and also being operative to cause the motor to be energized during engine cranking.

2. In a vehicle fuel system of the type having a fuel tank mounted electrical motor operated fuel pump and a fuel level gauge; the combination of a fuel pump assembly adapted to be insertable through an access opening in the fuel tank; the fuel pump assembly including housing means having therein a motor and on opposite sides of the motor inlet and outlet ends respectively including therein a peripheral pump driven by and coaxial with the motor and an axial brush assembly for the motor; the inlet and outlet ends having respectively inlet and outlet extensions defining inlet and outlet passages therein, the inlet end extension performing as an inlet storage area for the fuel and having an elongated filter element positioned thereon so as to extend along and lie on the tank bottom, the outlet end also having a vent communicating with the motor and extending to the exterior of the housing means, the peripheral pump including a vent extending to the exterior of the housing means and to atmosphere so as to provide both static and dynamic pump purging, the motor including an annular permanent field magnet mounted within the housing means coaxial with the peripheral pump, an armature shaft, an armature secured to the shaft and positioned within the field of the magnet for motor operation, the armature shaft having one end drive connected to the peripheral pump and the other end provided with a disk commutator, fluid passage means for transferring fluid from the peripheral pump between the interior of the housing and the exterior of the field magnet to the outlet passage in the outlet end and also through the motor to the outlet end vent; the brush assembly including a plurality of brushes each mounted in the outlet end for engagement with the motor disk commutator and each having a brush terminal, a fluid conduit formed of conductive material for suspending the fuel pump assembly from the tank so that the peripheral pump inlet extension is closely proximate the tank bottom and the rotational axes of the motor and the peripheral pump are substantially parallel to the tank bottom, the conduit having one end inserted in the outlet end extension and having a support element thereon connected to one of the brush terminals so as to connect the fuel pump assembly to the conduit for support thereon and also to electrically connect the conduit to the one brush terminal, the conduit having a mounting flange on the other end thereof arranged to sealingly cover the access opening and be releasably connected to the fuel tank, the mounting flange having a plurality of terminals including a power terminal electrically connected to the other brush terminal, a ground terminal electrically connected to the conduit and a fuel gauge terminal; and a fuel level sending unit positioned on the conduit between the mounting flange and the support element and including a resistance element having an end thereof connected to the gauge terminal, a movable contact electrically connected to the conduit and float means maneuvering the movable contact in accordance with the level of the fuel in the tank.

3. In a vehicle fuel system of the type having a fuel tank mounted electrical motor operated fuel pump, the combination of a fuel pump assembly adapted to be insertable through an access opening in the fuel tank; the fuel pump assembly including housing means having therein a motor and on opposite sides of the motor inlet and outlet ends respectively including therein a peripheral pump driven by and coaxial with the motor and an axial brush assembly for the motor; the inlet and outlet ends having respectively inlet and outlet passages therein, the peripheral pump including a vent extending to the exterior of the housing means and to atmosphere so as to provide both static and dynamic pump purging, the motor including an annular permanent field magnet mounted within the housing means coaxial with the peripheral pump impeller, a sleeve formed of a magnetic material and positioned on the periphery of the field magnet for providing a low reluctance return path for the magnetic flux, the sleeve being constructed and arranged to support the field magnet within housing means coaxial with the peripheral pump and so as to provide a fluid passage between the sleeve and the housing means from the peripheral pump to the outlet end outlet passage, an armature shaft, an armature secured to the shaft and positioned within the field of the magnet for motor operation, the armature shaft having one end drive connected to the peripheral pump and the other end provided with a disk commutator, the brush assembly including a pair of axially extending brush openings in the outlet end, each brush opening including an external brush terminal, a brush, and a conductive spring interposed between the external terminal and the brush for providing a conductive path therebetween and also for urging the brush into engagement with the motor disk commutator, the outlet end having a vent communicating with the motor and extending to the exterior of the housing means; and a fluid conduit formed of conductive material for suspending the fuel pump assembly from the tank so that the peripheral pump inlet passage is closely proximate the tank bottom and the rotational axes of the motor and the peripheral pump are substantially parallel to the tank bottom, the conduit having one end in fluid communication with the outlet end outlet passage and having a support element thereon connected to one of the brush terminals so as to connect the fuel pump assembly to the conduit for support thereon and also to electrically connect the conduit to the one brush terminal, the conduit having a mounting flange on the other end thereof arranged to sealingly cover the access opening and be releasably connected to the fuel tank, the mounting flange having a pair of terminals including a power terminal electrically connected to the other of the brush terminals and a ground terminal electrically connected to the conduit.

4. In a vehicle fuel system of the type having a fuel tank mounted electric motor operated fuel pump and a fuel level gauge; the combination of a fuel pump assembly adapted to be insertable through an access opening in the fuel tank and a fuel level gauge; the fuel pump assembly including housing means having therein a motor and on opposite sides of the motor inlet and outlet ends respectively including therein a peripheral pump driven by and coaxial with the motor and an axial brush assembly for the motor; the inlet and outlet ends each having a center bearing bore therein and also each having respectively inlet and outlet extensions defining inlet and outlet passages, the inlet end extension performing as an inlet storage area for the fuel and having an elongated filter element joined thereto, the peripheral pump including an impeller raceway provided with an outer annular channel having an inlet port communicating with the inlet passage and an outlet port, an outlet opening from the raceway, an impeller revolvable within the raceway and having a hub and a series of randomly spaced vanes extending from the hub and into the annular channel, a vent positioned in the annular channel between the inlet and the outlet ports and proximate the root of the vanes, the vent extending to the exterior of the housing means and to atmosphere so as to provide both static and dynamic pump purging, the motor including an annular permanent field magnet mounted within the housing means coaxial with the peripheral pump impeller, the field magnet being provided with a through armature opening in fluid communication with the pump outlet opening so that fluid is transferred therethrough, an armature shaft extending through the armature opening and coaxial therewith, an armature secured to the shaft and positioned within the armature opening so as to be within the field of the magnet for motor operation, the armature shaft having a drive end connected to the pump impeller and journaled in the inlet end and a commutator center bearing bore provided with a disk commutator and journaled in the center bearing bore in the outlet end, fluid passage means for transferring fluid from the outlet port in the inlet end between the interior of the housing and the exterior of the field magnet to the outlet passage in the outlet end, the brush assembly including a pair of diametrically opposed brush openings extending axially through the outlet end closely proximate the center bearing bore therein each brush opening including a brush terminal, a brush, and a conductive spring interposed between the brush terminal and the brush for providing a conductive path therebetween and also for urging the brush into engagement with the motor disk commutator, the outlet end having a vent communicating with the armature opening and extending to the exterior of the housing means; a fluid conduit formed of conductive material for suspending the fuel pump assembly from the tank so that the peripheral pump inlet extension is closely proximate the tank bottom and the rotational axes of the motor and the peripheral pump are substantially parallel to the tank bottom, the conduit having a tapered end inserted into the outlet end outlet extension and in fluid-tight communication therewith and having adjacent the tapered end thereof a support element connected to one of the brush terminals so as to connect the fuel pump assembly to the conduit for support thereon and also to electrically connect the conduit to the one brush terminal, the conduit having a mounting flange on the other end thereof arranged to sealingly cover the access opening and be releasably connected to the fuel tank, the mounting flange having a plurality of terminals including a power terminal electrically connected to the other of the brush terminals, a ground terminal electrically connected to the conduit, and a fuel gauge terminal; and a fuel level sending unit positioned on the conduit between the mounting flange and the support element and including a resistance element having an end thereof connected to the gauge terminal, a movable contact electrically connected to the conduit and float means maneuvering the movable contact in accordance with the level of the fuel in the tank.

5. In a vehicle fuel system of the type having an in-the-fuel-tank electric motor operated fuel pump and a fuel level gauge; the combination of a fuel pump assembly adapted to be insertable through an access opening in the fuel tank and a fuel level gauge; the fuel pump assembly including housing means having therein a motor and on opposite sides of the motor inlet and outlet ends respectively including therein a peripheral pump driven by and coaxial with the motor and an axial brush assembly for the motor; the inlet and outlet ends having respectively inlet and outlet passages, the peripheral pump including an impeller raceway provided with an outer annular channel having an inlet port communicating with the inlet passage and an outlet port, an outlet opening from the raceway, an impeller revolvable within the raceway and having a hub and a series of randomly spaced vanes extending from the hub and into the annular channel, a vent positioned in the annular channel between the inlet and the outlet ports and proximate the root of the vanes, the vent extending to the exterior of the housing means and to atmosphere so as to provide both static and dynamic pump purging, the motor including an annular permanent field magnet mounted within the housing means coaxial with the peripheral pump impeller, the field magnet being provided with a through armature opening in fluid communication with the pump outlet opening so that fluid is transferred therethrough for motor cooling and lubrication, an armature shaft extending through the armature opening and coaxial therewith, an armature secured to the shaft and positioned within the armature opening so as to be within the field of the magnet for motor operation, the armature shaft having one end connected to the pump impeller and the other end provided with a disk commutator, fluid passage means for transferring fluid from the outlet port in the inlet end between the interior of the housing and the exterior of the field magnet to the outlet passage in the outlet end; the brush assembly including a pair of polygonal-shaped brush openings axially extending through the outlet end, each brush opening having a brush terminal, a brush, and a conductive spring interposed between the brush terminal and the brush for providing a conductive path therebetween and also for urging the brush into engagement with the motor disk commutator, the outlet end having means venting the fuel within the armature opening to the exterior of the housing means and preventing both backflow from the outlet passage to the pump and the pressure of the fluid supplied by the pump from exceeding a predetermined maximum; a fluid conduit formed of conductive material for suspending the fuel pump assembly from the tank so that the peripheral pump inlet passage is closely proximate the tank bottom and the rotational axes of the motor and the peripheral pump are substantially parallel to the tank bottom, the conduit having one end in fluid communication with the outlet end outlet passage and having a support element thereon connected to one of the brush terminals so as to connect the fuel pump assembly to the conduit for support thereon and also to electrically connect the conduit to the one brush terminal, the conduit having a mounting flange on the other end thereof arranged to sealingly cover the access opening and be releasably connected to the fuel tank, the mounting flange having a plurality of terminals including a power terminal electrically connected to the other brush terminal, a ground terminal electrically connected to the conduit; a fuel gauge terminal; a fuel level sending unit positioned on the conduit between the mounting flange and the support element and including a resistance element having an end thereof connected to the gauge terminal, a movable contact electrically connected to the conduit and float means maneuvering the movable contact in accordance with the level of the fuel in the tank; and a resilient member joined to the housing means for preventing the housing means from contacting the tank bottom.

6. In an electric fuel pump system; the combination of housing means having therein a motor and on opposite sides of the motor inlet and outlet ends respectively including therein a peripheral pump driven by the motor and an axial brush assembly for the motor; the inlet and outlet ends having respectively inlet and outlet passages; the peripheral pump including an impeller raceway provide with an outer annular channel having an inlet port communicating with the inlet passage and an outlet port, an outlet opening from the raceway, an impeller revolvable within the raceway and having a hub and a series of vanes extending from the hub and into the annular channel, a vent positioned in the annular channel between the inlet and the outlet ports and proximate the root of the vanes, the vent extending to the exterior of the housing means and to atmosphere so as to provide both static and dynamic pump purging; the motor including an annular permanent field magnet mounted within the housing means, the field magnet being provided with a through armature opening in fluid communication with the pump outlet opening so that fluid is transferred therethrough for motor cooling and lubrication, an armature shaft extending through the armature opening and coaxial therewith, an armature secured to the shaft and positioned within the armature opening so as to be within the field of the magnet for motor operation, the armature shaft having one end connected to the pump impeller and the other end provided with a disk commutator; fluid passage means for transferring fluid from the outlet in the inlet end between the interior of the housing and the exterior of the field magnet to the outlet passage in the outlet end; the brush assembly including a plurality of brushes mounted in the outlet end for engagement with the motor disk commutator; the outlet end having a vent communicating with the armature opening and extending to the exterior of the housing means.

7. In an electric fuel pump system; the combination of a housing having a peripheral pump in one end thereof, the peripheral pump including a vaned impeller, peripheral inlet and outlet passages extending respectively to the exterior and the interior of the housing, an axial outlet passage extending also to the interior of the housing, and a vent extending to the exterior of the housing and to atmosphere, the vent being positioned proximate the root of the impeller vanes and opposite the inlet passage so as to provide both static and dynamic pump purging; a DC motor positioned within the housing adjacent the peripheral pump and coaxial therewith, the DC motor including an annular permanent field magnet supported by the housing, an armature shaft extending through the field magnet and coaxial therewith, an armature secured to the shaft and positioned within the magnetic field of the magnet for motor operation, the armature shaft having a drive end drive connected to the pump impeller and a commutator end provided with a disk commutator; fluid passage means communicating with the peripheral pump outlet passage for transferring fluid between the housing and the field magnet; locator means axially and circumferentially locating the field magnet relative to the peripheral pump inlet passage; an end cover for the other end of the housing and including a center bearing bore for supporting the commutator end of the motor armature shaft, a pair of diametrically opposed brush openings closely proximate the center bearing bore and axially extending through the end cover, each brush opening including an exterior terminal, a brush, and a conductive spring interposed between the terminal and the brush for providing a conductive path therebetween and also for urging the brush into engagement with the motor disk commutator, the end cover having an outlet, a vent on the opposite side from the outlet and extending through the cover to the exterior thereof, and a fluid guide portion for directing fluid from the fluid passage means to the outlet and also for directing the fluid passing through the motor through the vent; and positioning means for axially and circumferentially positioning the end cover relative to the field magnet so that the brushes and the field magnet have a predetermined polar relationship and the brushes and the motor disk commutator have a certain axial thrust relationship.

8. In an electric fuel pump system; the combination of housing means having therein a motor and on opposite sides of the motor inlet and outlet ends respectively including therein a peripheral pump driven by the motor and an axial brush assembly for the motor; the inlet and outlet ends having a center bearing bore therein and also having respectively inlet and outlet passages; the peripheral pump including an impeller raceway provided with an outer annular channel having an inlet port communicating with the inlet passage and an outlet port, an axial outlet opening from the raceway, an impeller revolvable within the raceway and having a hub and a series of nonconnected randomly spaced vanes upstanding from the hub and into the annular channel, a vent positioned in the annular channel between the inlet and the outlet ports and proximate the root of the vanes, the vent extending to the exterior of the housing means and to atmosphere so as to provide both static and dynamic pump purging; the motor including an annular permanent field magnet mounted within the housing means, the field magnet being provided with a through armature opening in fluid communication with the pump axial outlet opening so that fluid is transferred therethrough for motor cooling and lubrication, an armature shaft extending through the armature openin gand coaxial therewith, an armature secured to the shaft and positioned within the armature opening so as to be within the field of the magnet for motor operation, the armature shaft having a drive end connected to the pump impeller and journaled in the center bearing bore in the inlet end of the housing means and a commutator end journaled in the center bearing bore in the outlet end of housing means and provided with a disk commutator, the field magnet having the fluid passage means for transferring fluid from the outlet port in the inlet end between the interior of the housing and the exterior of the field magnet to the outlet passage in the outlet end; the brush assembly including a pair of diametrically opposed brush openings closely proximate the center bearing bore and axially extending through the outlet end, each brush opening including an exterior terminal, a brush, and a conductive spring interposed between the terminal and the brush for providing a conductive path therebetween and also for urging the brush into engagement with the motor disk commutator; the outlet end having a vent on the opposite side thereof from the outlet passage and extending to the exterior of the outlet end and a fluid guide portion for directing fluid from the fluid passage means to the outlet passage and also for directing the fluid passing through the motor armature opening in the outlet end vent, and means for axially and circumferentially positioning the inlet and outlet ends relative to the permanent field magnet.

9. In an electric fuel pump system; the combination of a housing formed of a magnetic material and having a peripheral pump in one end thereof, the peripheral pump including a vaned impeller, peripheral inlet and outlet passages extending respectively to the exterior and the interior of the housing, an axial outlet passage extending also to the interior of the housing, and a vent extending to the exterior of the housing and to atmosphere, the vent being positioned proximate the root of the impeller vanes and opposite the inlet passage so as to provide both static and dynamic pump purging; a DC motor positioned within the housing adjacent the peripheral pump and coaxial therewith, the DC motor including an annular permanent field magnet supported by the housing so that the housing provides a low reluctance return path for the magnetic flux, the field magnet having an armature opening therethrough in communication with the pump axial outlet opening, a plurality of axially extending through grooves in the periphery thereof for facilitating the transfer of fluid therethrough, an armature shaft extending through the armature opening and coaxial therewith, an armature secured to the shaft and positioned within the magnet field of the magnet for motor operation, the armature shaft having a drive end drive connected to the pump impeller and a commutator end provided with a disk commutator; and an end cover for the other end of the housing and including a pair of diametrically opposed brush openings closely proximate the center bearing bore and axially extending through the end cover, each brush opening including an exterior terminal, a brush, and a conductive spring interposed between the terminal and the brush for providing a conductive path therebetween and also for urging the brush into engagement with the motor disk commutator, the end cover having an outlet communicating with the fluid passing through the grooves in the field magnet, a vent on the opposite side from the outlet and extending through the cover into communication with fluid passing through the motor armature opening so that fluid is circulated through the motor for cooling and lubrication.

10. In an electric fuel pump system; the combination of a housing formed of a magnetic material; a DC motor positioned within the housing; the DC motor including an annular two-pole permanent field magnet slidably positioned within the housing so that the conductive housing provides a low reluctance return path for the magnetic flux, an armature shaft extending through the field magnet and coaxial therewith, and armature secured to the shaft and positioned within the field of the magnet for motor operation, the armature shaft having a drive end provided with a drive part having drive tangs and a commutator end provided with a disk commutator, the field magnet also having a plurality of axially extending through grooves in the periphery thereof for facilitating the transfer of fluid therethrough; a peripheral pump positioned in the end of the housing and adjacent the drive end of the armature shaft; the peripheral pump including a casing formed as two interlocking parts having confronting spaced-apart outer and inner side walls defining an impeller raceway with an outer annular channel and having confronting side and peripheral stripper abutments in the annular channel and inlet and outlet ports positioned adjacent to and on opposite sides of the side and peripheral stripper abutments and communicating with the annular channel, the inner side wall of the casing having a center opening therethrough and the outer side wall of the casing having a center shaft bearing bore therein for receiving the drive end of the armature shaft, the casing having a tubular inlet extension communicating with the inlet port and providing an inlet fluid storage area, locator means for axially and circumferentially positioning the field magnet relative to the pump casing, and an annular axially extending portion surrounding the center opening in the casing inner side wall for directig the fluid from the outlet port to the grooves in the field magnet and also for directing fluid from the center opening through the motor for motor cooling and lubrication, an impeller revolvable within the raceway, the impeller having a hub and a series of vanes aligned normal to the impeller rotational axis and randomly spaced on and upstanding from the hub and into the annular channel, the vanes being separated from each other along the radial extent of each so as to permit lateral fluid flow therebetween, the hub of the impeller having a central guideway through which the drive end of the armature shaft extends and spaced drive slots engaging the drive tangs on the drive part of the armature shaft so that the impeller has a floating type drive connection with the armature shaft and is substantially coaxial therewith, and a vent positioned with the casing annular channel between the inlet and the outlet ports and proximate the root of the vanes, the vent extending to the exterior of the casing and to the atmosphere so as to provide both static and dynamic purging; and an end cover positioned in the end of the housing adjacent the disk commutator; the end cover including locator means for positioning the end cover axially and circumferentially relative to the motor field magnet, the end cover also including a polygonal-shaped center bearing bore for supporting the commutator end of the armature shaft and a pair of diametrically opposed polygonal-shaped brush openings closely proximate the center bearing bore and axially extending through the end cover, each brush opening including an exterior terminal, a cylindrical-shaped brush and a conductive spring interposed between the terminal and the brush for providing a conductive path therebetween and also for urging the brush into engagement with the motor disk commutator, the end cover having an outlet, a vent on the opposite side thereof from the outlet and extending through the end cover and to the exterior thereof, and a fluid guide portion for directing fluid from the grooves in the field magnet to the outlet and also for directing the fluid passing through the motor through the vent.

11. In an electric fuel pump system; the combination of a housing having a peripheral pump in one end thereof, the peripheral pump including a vaned impeller, peripheral inlet and outlet passages extending respectively to the exterior and the interior of the housing, an axial outlet passage extending also to the interior of the housing, and a vent extending to the exterior of the housing and to atmosphere, the vent being positioned proximate the root of the impeller vanes and opposite the inlet passage so as to provide both static and dynamic pump purging; a motor positioned within the housing adjacent the peripheral pump and coaxial therewith, the motor including an annular permanent field magnet supported by the housing and having an armature opening therethrough communicating with the pump axial outlet passage, a sleeve formed of a magnetic material and positioned on the periphery of the field magnet for providing a low reluctance return path for the magnetic flux, the sleeve being constructed and arranged to maintain the field magnet substantially concentric with the housing and spaced therefrom so as to provide a fluid passage between the sleeve and the housing for communication with the pump outlet passage, an armature shaft extending through the armature opening in the field magnet and coaxial therewith, an armature secured to the shaft and positioned within the magnetic field of the magnet for motor operation, the armature shaft having a drive end drive connected to the pump impeller and a commutator end provided with a disk commutator; and an end cover for the other end of the housing and including a pair of diametrically opposed brush openings axially extending through the end cover, each brush opening including an exterior terminal, a brush, and a conductive spring interposed between the terminal and the brush for providing a conductive path therebetween and also for urging the brush into engagement with the motor disk commutator, the end cover having an outlet communicating with the fluid passage between the sleeve and the housing, and a vent on the opposite side from the outlet and extending through the cover into communication with fluid passing through the motor armature opening so that fluid is circulated through the motor for cooling and lubrication.

12. In an electric fuel pump system; the combination of housing means having therein a motor and on opposite sides of the motor inlet and outlet ends respectively including therein a peripheral pump driven by the motor and an axial brush assembly for the motor; the inlet and outlet ends having respectively inlet and outlet passages; the peripheral pump including an impeller raceway provided with an outer annular channel having an inlet port communicating with the inlet passage and an outlet port, an outlet opening from the raceway, an impeller revolvable within the raceway and having a hub and a series of vanes extending from the hub and into the annular channel, a vent positioned in the annular channel between the inlet and the outlet ports and proximate the root of the vanes, the vent extending to the exterior of the housing means and to atmosphere so as to provide both static and dynamic pump purging; the motor including an annular permanent field magnet mounted within the housing means, the field magnet being provided with a through armature opening in fluid communication with the pump outlet opening so that fluid is transferred therethrough for motor cooling and lubrication, an armature shaft extending through the armature opening and coaxial therewith, an armature secured to the shaft and positioned within the armature opening so as to be within the field of the magnet for motor operation, the armature shaft having one end drive connected to the pump impeller and the other end provided with a disk commutator, the field magnet having a sleeve formed of magnetic material positioned thereon for providing a low reluctance return path for the magnetic flux, the sleeve being constructed and arranged to maintain the field magnet coaxial with the pump and spaced from the housing so as to provide a fluid passage between the sleeve and the housing for transferring fluid from the pump outlet port to the outlet end outlet passage; the brush assembly including a plurality of brushes mounted in the outlet end for engagement with the motor disk commutator; the outlet end also having a vent communicating with the armature opening and extending to the exterior of the housing means.

13. In an electric fuel pump system; the combination of a housing; a DC motor positioned within the housing; the DC motor including an annular two-pole permanent field magnet slidably positioned within the housing, a sleeve formed of a magnetic material and slidably positioned on the periphery of the field magnet for providing a low reluctance return path for the magnetic flux, the sleeve being constructed and arranged to maintain the field magnet substantially concentric with the housing and spaced therefrom so as to provide a fluid passage between the sleeve and the housing, an armature shaft extending through the field magnet and coaxial therewith, and an armature secured to the shaft and positioned within the field of the magnet for motor operation, the armature shaft having a drive and provided with a drive part having drive tangs and a commutator end provided with a disk commutator; a peripheral pump positioned in the end of the housing and adjacent the drive end of the armature shaft; the peripheral pump including a casing formed as two interlocking parts having confronting spaced-apart outer and inner side walls defining an impeller raceway with an outer annular channel and having confronting side and peripheral stripper abutments in the annular channel and inlet and outlet ports positioned adjacent to and on opposite sides of the side and peripheral stripper abutments and communicating with the annular channel, the inner side wall of the casing having a center opening therethrough and the outer side wall of the casing having a center shaft bearing bore therein for receiving the drive end of the armature shaft, the casing having a tubular inlet extension communicating with the inlet port and providing an inlet fluid storage area, locator means for axially and circumferentially positioning the field magnet relative to the pump casing, and an annular axially extending portion surrounding the center opening in the casing inner side wall for directing the fluid from the outlet port to the fluid passage between the sleeve and the housing and also for directing fluid from the center opening by way of the motor armature for motor cooling and lubrication, an impeller revolvable within the raceway and having a hub, a series of vanes aligned normal to the impeller rotational axis and randomly spaced and upstanding from the hub and into the annular channel, the vanes being separated from each other along the radial extent of each so as to permit lateral fluid flow therebetween, the hub of the impeller having a central guideway through which the drive end of the armature shaft extends and spaced drive slots engaging the drive tangs on the drive part of the armature shaft so that the impeller has a floating type drive connection with the armature shaft and is substantially coaxial therewith, and a vent positioned with the casing annular channel between the inlet and the outlet ports and proximate the root of the vanes, the vent extending to the exterior of the casing and to the atmosphere so as to provide both static and dynamic purging; and an end cover positioned in the end of the housing adjacent the disk commutator; the end cover including locator means for positioning the end cover axially and circumferentially relative to the motor field magnet, the end cover also including a polygonal-shaped center bearing bore for supporting the commutator end of the armature shaft and a pair of diametrically opposed polygonal-shaped brush openings closely proximate the center bearing bore and axially extending through the end cover, each brush opening including an exterior terminal, a cylindrical-shaped brush and a conductive spring interposed between the terminal and the brush for providing a conductive path therebetween and also for urging the brush into engagement with the motor disk commutator, the end cover having an outlet, a vent on the opposite side thereof from the outlet and extending through the end cover and to the exterior thereof, and a fluid guide portion for directing fluid from the fluid passage between the sleeve and the housing to the outlet and also for directing fluid passing through the motor through the vent.

14. In an electric fuel pump system; the combination of housing means having therein a motor and on opposite sides of the motor inlet and outlet ends respectively including therein a peripheral pump driven by the motor and an axial brush assembly for the motor; the inlet and outlet ends having respectively inlet and outlet passages; the peripheral pump including an impeller raceway provided with an outer annular channel having an inlet port communicating with the inlet passage and an outlet port, an outlet opening from the raceway, an impeller revolvable within the raceway and having a hub and a series of vanes extending from the hub and into the annular channel, a vent positioned in the annular channel between the inlet and the outlet ports and proximate the root of the vanes, the vent extending to the exterior of the housing means and to atmosphere so as to provide both static and dynamic pump purging; the motor including an annular permanent field magnet mounted within the housing means, the field magnet being provided with a through armature opening in fluid communication with the pump outlet opening so that fluid is transferred therethrough for motor cooling and lubrication, an armature shaft extending through the armature opening and coaxial therewith, an armature secured to the shaft and positioned within the armature opening so as to be within the field of the magnet for motor operation, the armature shaft having one end connected to the pump impeller and the other end provided with a disk commutator; fluid passage means for transferring fluid from the outlet port in the inlet end between the interior of the housing and the exterior of the field magnet to the outlet passage in the outlet end; the brush assembly including a plurality of brushes mounted in the outlet end for engagement with the motor disk commutator; the outlet end having therein means venting the fluid within the armature opening to the exterior of the housing means and both preventing backflow from the outlet passage to the pump and preventing the pressure of fluid supplied to the outlet passage from exceeding a predetermined maximum.

15. In an electric fuel pump system; the combination of a housing having a peripheral pump in one end thereof, the peripheral pump including a vaned impeller, peripheral inlet and outlet passages extending respectively to the exterior and the interior of the housing, an axial outlet passage extending also to the interior of the housing, and a vent extending to the exterior of the housing and to atmospehre, the vent being positioned proximate the root of the impeller vanes and opposite the inlet passage so as to provide both static and dynamic pump purging; a motor positioned within the housing adjacent the peripheral pump and coaxial therewith, the motor including an annular permanent field magnet supported by the housing, an armature shaft extending through the field magnet and coaxial therewith, an armature secured to the shaft and positioned within the magnetic field of the magnet for motor operation, the armature shaft having a drive end drive connected to the pump impeller and a commutator end provided with a disk commutator; fluid passage means communicating with the peripheral pump outlet passage for transferring fluid between the housing and the field magnet; an end cover for the other end of the housing and including a pair of brushes mounted therein, the brushes each axially extending into engagement with the motor disk commutator, the end cover having an outlet communicating with the fluid passage means, relief valve means for both continuously venting to the exterior of the housing the fluid passing through the motor and for limiting the pressure of the fluid in the outlet to a predetermined maximum, and a check valve for preventing backflow from the outlet to the pump.

16. In an electric fuel pump system; the combination of a housing; a DC motor positioned within the housing; the DC motor including an annular permanent field magnet slidably positioned within the housing, an armature shaft extending through the field magnet and coaxial therewith, and an armature secured to the shaft and positioned within the field of the magnet for motor operation, the armature shaft having a drive end provided with a drive part having drive tangs and a commutator end provided with a disk commutator, the annular field magnet also including main fluid passage means at the periphery thereof for facilitating the transfer of fluid therethrough between the housing and the field magnet; a peripheral pump positioned in the end of the housing and adjacent the drive end of the armature shaft; the peripheral pump including a casing formed as two interlocking parts having confronting spaced-apart outer and inner side walls defining an impeller raceway with an outer annular channel and having confronting side and peripheral stripper abutments in the annular channel and inlet and outlet ports positioned adjacent to and on opposite sides of the side and peripheral stripper abutments and communicating with the annular channel, the inner side wall of the casing having a center opening therethrough and the outer side wall of the casing having a center shaft bearing bore therein for receiving the drive end of the armature shaft, the casing having a tubular inlet extension communicating with the inlet port and providing an inlet fluid storage area, locator means for axially and circumferntially positioning the field magnet relative to the pump casing, and an annular axially extending portion ring surrounding the center opening in the casing inner side wall for directing the fluid from the outlet port to the inner fluid passage means and also for directing fluid from the center opening through the motor for motor cooling and lubrication, an impeller revolvable within the raceway, the impeller having a hub and a series of vanes aligned normal to the impeller rotational axis and randomly spaced on and upstanding from the hub and into the annular channel, the vanes being separated from each other along the radial extent of each so as to permit lateral fluid flow therebetween, the hub of the impeller having a central guideway through which the drive end of the armature shaft extends and spaced drive slots engaging the drive tangs on the drive part of the armature shaft so that the impeller has a floating type drive connection with the armature shaft and is substantially coaxial therewith, and a vent positioned with the casing annular channel between the inlet and the outlet ports and proximate the root of the vanes, the vent extending to the exterior of the casing and to the atmosphere so as to provide both static and dynamic purging; and an end cover positioned in the end of the housing adjacent the disk commutator, the end cover including locator means for positioning the end cover axially and circumferentially relative to the DC motor field magnet, the end cover also including a polygonal-shaped center bearing bore for supporting the commutator end of the armature shaft and a pair of diametrically opposed polygonal-shaped brush openings closely proximate the center bearing bore and axially extending through the end cover, each brush opening including an exterior terminal, a cylindrical-shaped brush and a conductive spring interposed between the terminal and the brush for providing a conductive path therebetween and also for urging the brush into engagement with the motor disk commutator, the end cover having an outlet, relief valve means both for continuously venting to the exterior of the end cover the fluid passing through the motor and for limiting the pressure of the fluid supplied to the outlet to a predetermined maximum, a check valve for preventing backflow from the outlet to the pump, and a fluid guide portion for directing fluid from the fluid passage means to the outlet and also for directing the fluid passing through the motor to the relief valve means for venting.

17. In an electric fuel pump system; the combination of a housing having a peripheral pump in one end thereof, the peripheral pump including a vaned impeller, peripheral inlet and outlet passages extending respectively to the exterior and the interior of the housing, an axial outlet passage extending also to the interior of the housing, and a vent extending to the exterior of the housing and to atmosphere, the vent being positioned proximate the root of the impeller vanes and opposite the inlet passage so as to provide both static and dynamic pump purging; a motor positioned within the housing adjacent the peripheral pump and coaxial therewith, the motor including an annular permanent field magnet supported by the housing, an armature shaft extending through the field magnet and coaxial therewith, an armature secured to the shaft and positioned within the magnetic field of the magnet for motor operation, the armature shaft having a drive and drive connected to the pump impeller and a commutator end provided with a disk commutator; fluid passage means communicating with the peripheral pump outlet passage for transferring fluid between the housing and the field magnet; and an end cover for the other end of the housing and including a pair of brushes mounted therein, the brushes each axially extending into engagement with the motor disk commutator, the end cover having an outlet communicating with the fluid passage means, a vent on the opposite side from the outlet and extending through the cover to the exterior thereof, check valve means preventing backflow from the outlet to the pump, and pressure relief valve means limiting the pressure of the fluid supplied to the outlet.

18. In an electric fuel pump system; the combination of a housing; a DC motor positioned within the housnig; the DC motor including an annular two-pole permanent field magnet slidably positioned within the housing, an armature shaft extending through the field magnet and coaxial therewith, and an armature secured to the shaft and positioned within the field of the magnet for motor operation, the armature shaft having a drive end provided with a drive part having drive tangs and a commutator end provided with a disk commutator, the field magnet including fluid passage means at the periphery thereof for facilitating the transfer of fluid therethrough between the housing and the field magnet; a peripheral pump positioned in the end of the housing and adjacent the drive end of the armature shaft; the peripheral pump including a casing formed as two interlocking parts having confronting spaced-apart outer and inner side walls defining an impeller raceway with an outer annular channel and having confronting side and peripheral stripper abutments in the annular channel and inlet and outlet ports positioned adjacent to and on opposite sides of the side and peripheral stripper abutments and communicating with the annular channel, the inner side wall of the casing having a center opening therethrough and the outer side wall of the casing having a center shaft bearing bore therein for receiving the drive end of the armature shaft, the casing having a tubular inlet extension communicating with the inlet port and providing an inlet fluid storage area, locator means for axially and circumferentially positioning the field magnet relative to the pump casing, and an annular axially extending portion surrounding the center opening in the casing inner side wall for directing the fluid from the outlet port to the fluid passage means and also for directing fluid from the center opening through the motor for motor cooling and lubrication, an impeller revolvable within the raceway, the impeller having a hub and a series of vanes aligned normal to the impeller rotational axis and randomly spaced on and upstanding from the hub and into the annular channel, the vanes being separated from each other along the radial extent of each so as to permit lateral fluid flow therebetween, the hub of the impeller having a central guideway through which the drive end of the armature shaft extends and spaced drive slots engaging the drive tangs on the drive part of the armature shaft so that the impeller has a floating type drive connection with the armature shaft and is substantially coaxial therewith, and a vent positioned with the casing annular channel between the inlet and the outlet ports and proximate the root of the vanes, the vent extending to the exterior of the casing and to the atmosphere so as to provide both static and dynamic purging; and an end cover positioned in the end of the housing adjacent the disk commutator, the end cover including locator means for positioning the end cover axially and circumferentially relative to the DC motor field magnet, the end cover also including a polygonal-shaped center bearing bore for supporting the commutator end of the armature shaft and a pair of diametrically opposed polygonal-shaped brush openings closely proximate the center bearing bore and axially extending through the end cover, each brush opening including an exterior terminal, a cylindrical-shaped brush and a conductive spring interposed between the terminal and the brush for providing a conductive path therebetween and also for urging the brush into engagement with the motor disk commutator, the end cover having an outlet, a check valve for preventing backflow from the outlet to the pump, a pressure relief valve for limiting the pressure of the fluid supplied to the outlet to a predetermined maximum, a vent on the opposite side thereof from the outlet and extending through the end cover and to the exterior thereof, and a fluid guide portion for directing fluid from the fluid passage means to the outlet and also for directing the fluid passing through the motor through the vent.

19. In an electric fuel pump system; the combination of a cylindrical housing; a DC motor positioned within the housing; the DC motor including an annular two-pole permanent field magnet slidably positioned within the housing, an armature shaft extending through the field magnet and coaxial therewith, and an armature secured to the shaft and positioned within the field of the magnet for motor operation, the armature shaft having a drive end provided with a drive part having drive tangs and a commutator end provided with a disk commutator, the field magnet including main fluid passage means at the periphery thereof for facilitating the transfer of fluid therethrough between the housing and the field magnet; a peripheral pump positioned in the end of the housing and adjacent the drive end of the armature shaft; the peripheral pump including a casing formed as two interlocking parts having confronting spaced-apart outer and inner side walls defining an impeller raceway with an outer annular channel and having confronting side and peripheral stripper abutments in the annular channel and inlet and outlet ports positioned adjacent to and on opposite sides of the side and peripheral stripper abutments and communicating with the annular channel, the inner side wall of the casing having a center opening therethrough and the outer side wall of the casing having a center shaft bearing bore therein for receiving the drive end of the armature shaft, the casing having a tubular inlet extension communicating with the inlet port and providing an inlet fluid storage area, locator means for axially and circumferentially positioning the field magnet relative to the pump casing, and an annular axially extending portion surrounding the center opening in the casing inner side wall for directing the fluid from the outlet port to the fluid passage means and also for directing fluid from the center opening through the motor for motor cooling and lubrication, an impeller revolvable within the raceway, the impeller having a hub and a series of vanes aligned normal to the impeller rotational axis and randomly spaced on and upstanding from the hub and into the annular channel, the vanes being separated from each other along the radial extent of each so as to permit lateral fluid flow therebetween, the hub of the impeller having a central guideway through which the drive end of the armature shaft extends and spaced drive slots engaging the drive tangs on the drive part of the armature shaft so that the impeller has a floating type drive connection with the armature shaft and is substantially coaxial therewith, and a vent positioned within the casing annular channel between the inlet and the outlet ports and proximate the root of the vanes, the vent extending to the exterior of the casing and to the atmosphere so as to provide both static and dynamic purging; the housing having integral therewith an end cover positioned in the end thereof adjacent the disk commutator, the end cover including locator means for positioning the end cover axially and circumferentially relative to the DC motor field magnet, the end cover also including a polygonal-shaped center bearing bore for supporting the commutator end of the armature shaft and a pair of diametrically opposed polygonal-shaped brush openings closely proximate the center bearing bore and axially extending through the end cover, each brush opening including an exterior terminal, a brush and a conductive spring interposed between the terminal and the brush for providing a conductive path therebetween and also for urging the brush into engagement with the motor disk commutator, the end cover having an outlet, a vent on the opposite side thereof from the outlet and extending through the end cover and to the exterior thereof, and a fluid guide portion for directing fluid from the main fluid passage means to the outlet and also for directing the fluid passing through the motor through the vent.

20. In an electric fuel pump system; the combination of a housing; a DC motor positioned within the housing; the DC motor including an annular two-pole permanent field magnet slidably positioned within the housing, an armature shaft extending through the field magnet and coaxial therewith, and an armature secured to the shaft and positioned within the field of the magnet for motor operation, the armature shaft having a drive and provided with a drive part having drive tangs and a commutator end provided with a disk commutator, the field magnet including fluid passage means at the periphery thereof for facilitating the transfer of fluid therethrough between the housing and the field magnet; a peripheral pump positioned in the end of the housing and adjacent the drive end of the armature shaft; the peripheral pump including a casing formed as two interlocking parts having confronting spaced-apart outer and inner side walls defining an impeller raceway with an outer annular channel and having confronting side and peripheral stripper abutments in the annular channel and inlet and outlet ports positioned adjacent to and on opposite sides of the side and peripheral stripper abutments and communicating with the annular channel, one of the casing interlocking parts being integral with the housing, the inner side wall of the casing having a center opening therethrough and the outer side wall of the casing having a center shaft bearing bore therein for receiving the drive end of the armature shaft, the casing having a tubular inlet extension communicating with the inlet port and providing an inlet fluid storage area, locator means for axially and circumferentially positioning the field magnet relative to the pump casing, and an annular axially extending portion surrounding the center opening in the casing inner side wall for directing the fluid from the outlet port to the fluid passage means and also for directing the fluid from the center opening through the motor for motor cooling and lubrication, an impeller revolvable within the raceway, the impeller having a hub and a series of vanes aligned normal to the impeller rotational axis and randomly spaced on and upstanding from the hub and into the annular channel, the vanes being separated from each other along the radial extent of each so as to permit lateral fluid flow therebetween, the hub of the impeller having a central guideway through which the drive end of the armature shaft extends and spaced drive slots engaging the drive tangs on the drive part of the armature shaft so that the impeller has a floating type drive connection with the armature shaft and is substantially coaxial therewith, and a vent positioned within the casing annular channel between the inlet and the outlet ports and proximate the root of the vanes, the vent extending into the exterior of the casing and to the atmosphere so as to provide both static and dynamic purging; and an end cover positioned in the end of the housing adjacent the disk commutator; the end cover including locator means for positioning the end cover axially and circumferentially relative to the DC motor field magnet, the end cover also including a polygonal-shaped center bearing bore for supporting the commutator end of the armature shaft and a pair of diametrically opposed polygonal-shaped brush openings closely proximate the center bearing bore and axially extending through the end cover, each brush opening including an exterior terminal, a brush and a conductive spring interposed between the terminal and the brush for providing a conductive path therebetween and also for urging the brush into engagement with the motor disk commutator, the end cover having an outlet, a vent on the opposite side thereof from the outlet and extending through the end cover and to the exterior thereof, and a fluid guide portion for directing fluid from the fluid passage means to the outlet and also for directing the fluid passing through the motor through the vent.

21. In a peripheral fluid pump; the combination of a cylindrical casing having a series of spaced fingers of a certain shape extending axially from the periphery thereof; an annular cover having a series of slots in the periphery thereof shaped and spaced for reception of the casing fingers of a corresponding shape and spacing so that an interlocking engagement is provided for detachably securing the cover plate to the cylindrical casing in a predetermined alignment relationship; the casing and the cover having confronting spaced-apart side walls each including annular lands and annular channels extending both radially outwardly and laterally inwardly from the annular lands; inlet and outlet ports respectively in the casing and cover annular channels; the casing having side and peripheral stripper abutments in the annular channel thereof and the cover having a side stripper abutment positioned in the annular channel thereof opposite to and confronting the casing side stripper abutment so that when the casing and cover are secured together the abutments are between the inlet and outlet ports; the casing also having a tubular inlet extension communicating with the inlet port for providing an inlet fluid storage area, and a vent positioned within the casing annular channel proximate the casing side wall annular land and on the side opposite the side stripper abutment so as to be between the inlet and outlet ports when the casing and the cover are secured together; the vent extending to the exterior of the casing so as to provide both static and dynamic vapor purging; an impeller mounted within the housing between the confronting side walls and having a hub provided with opposite annular lands of substantially the same radial extent as the impeller hub and also the casing and cover side wall annular lands, the impeller annular lands being spaced apart a lateral extent closely approximating the lateral extent between the casing and cover side wall annular lands so as to provide both a running and sealing fit therebetween; the impeller also having randomly spaced vanes aligned normal to the impeller rotational axis and radially extending outwardly from the hub thereon, the adjacent vanes being separated from each other along the radial extent of each so as to provide through fluid passages therebetween; the lateral extent of the end channels from the vanes being between about 25% and about 35% of the lateral extent of the vanes; the radial clearance between the vanes and the peripheral stripper abutment being between about .4% and about .9% of the diametral extent of the impeller and the radial clearance between the vanes and the casing and cover annular channels being between about 3% and about 4% of the diametral extent of the impeller.

22. In a peripheral fluid pump; the combination of a cylindrical casing having a series of spaced fingers of a certain shape extending axially from the periphery thereof; an annular cover having a series of slots in the periphery thereof for reception of the casing fingers of a corresponding shape and spacing so that an interlocking engagement is provided for detachably securing the cover plate to the cylindrical casing in a predetermined alignment relationship; the casing and the cover having confronting spaced-apart side walls each including outer annular channels; inlet and outlet ports respectively in the casing and cover annular channels; the casing having side and peripheral stripper abutments in the annular channel thereof and the cover having a side stripper abutment positioned in the annular channel thereof opposite to and confronting the casing side stripper abutment so that when the casing and cover are secured together the abutments are between the inlet and outlet ports; the casing also having in the side wall thereof a vent positioned within the casing annular channel proximate the inner diameter thereof and on the side opposite the side stripper abutment so as to be between the inlet and outlet ports when the casing and the cover are secured together; the vent being of a cross-sectional area of about 5% of the cross-sectional area of the outlet port and extending to the exterior of the casing so as to provide both static and dynamic vapor purging; an impeller mounted within the housing between the confronting side walls and having a hub; the impeller also having randomly spaced vanes aligned normal to the impeller rotational axis and radially extending outwardly from the hub thereon, the adjacent vanes being separated from each other along the radial extent of each so as to provide through fluid passages therebetween; the radial extent of the vanes being between about 35% and about 40% of the radial extent of the impeller and the lateral extent of the vanes being between about 70% and about 90% of the radial extent of the vanes.

23. In a peripheral fluid pump; the combination of a housing formed in two parts with an interlocking interference fit therebetween and together defining a raceway with an outer annular channel and having confronting side and peripheral stripper abutments in the annular channel and inlet and outlet ports positioned adjacent to and on opposite sides of the side peripheral stripper abutments and communicating with the annular channel; and an impeller revolvable within the raceway and having a hub provided with a series of vanes, the hub of the impeller having a central drive shaft guideway and drive slots therein spaced circumferentially around the guideway, the housing having a vent positioned within the annular chamber substantially on the side opposite the ports and proximate the root of the vanes, the vent having a cross-sectional area of about 5% of the outlet port and extending through the housing to atmosphere so as to provide both static and dynamic purging.

24. A peripheral pump comprising, in combination, inlet and outlet bodies together defining an impeller raceway and an outer annular channel provided with inlet and outlet ports having stripper abutments separating the ports, an impeller revolvably positioned within the raceway, one of the bodies having spaced axially extending fingers and the other of the bodies having spaced notches so shaped as to have an interference fit with the fingers and thereby detachably secure the bodies together, one of the fingers and one of the notches being of a different size so that the bodies are secured together with a certain alignment, the impeller having a hub provided with a series of randomly spaced vanes upstanding from the periphery of the hub.

25. In a peripheral fluid pump, the combination of a housing defining a raceway with an outer annular channel and having confronting side and peripheral stripper abutments in the channel, inlet and outlet ports positioned adjacent to and on opposite sides of the side peripheral stripper abutments, the inlet being positioned within the annular channel and the outlet port being positioned radially outwardly from the annular channel and in communication therewith, an impeller revolvable within the raceway and having a hub and a series of vanes aligned normal to the impeller rotational axis and randomly spaced and upstanding from the hub thereof and into the annular channel, the vanes being separated from each other along the radial extent of each so as to permit lateral fluid flow therebetween and having a radial extent such that the sides of the vanes pass over the inlet port and cause fluid to be impelled outwardly from the periphery of the vanes to the outlet port, and a vent located in the annular channel proximate the inner radial end of the vanes, the vent extending to the exterior of the housing for both static and dynamic purging.

References Cited

UNITED STATES PATENTS

| | | | |
|---|---|---|---|
| 2,311,179 | 2/1943 | Berry | 123—179 |
| 2,370,249 | 2/1945 | Korte et al. | 123—179 |
| 2,504,670 | 4/1950 | Everest | 123—179 |
| 3,006,603 | 10/1961 | Caruso et al. | 253—39 |
| 3,095,820 | 7/1963 | Sanborn et al. | 103—96 |
| 3,197,176 | 7/1965 | Brunel et al. | 253—2 |
| 3,259,072 | 7/1966 | Carpenter | 103—87 |
| 3,211,935 | 10/1965 | Sones | 103—87 |

FRED C. MATTERN, JR., *Primary Examiner.*

LEONARD H. GERIN, *Assistant Examiner.*

U.S. Cl. X.R.

103—87, 96

UNITED STATES PATENT OFFICE
CERTIFICATE OF CORRECTION

Patent No. 3,418,991                                December 31, 1968

John E. Shultz et al.

It is certified that error appears in the above identified patent and that said Letters Patent are hereby corrected as shown below:

Column 1, line 70, "overal" should read -- overall --. Colu line 28, "opopsite" should read -- opposite --. Column 5, lines and 31, "tabular", each occurrence, should read -- tubular --. Column 11, line 52, "semilar" should read -- similar --; line 69 "guage" should read -- gauge --. Column 15, line 36, "reuctance" should read -- reluctance --. Column 18, lines 7 and 8, "provide should read -- provided --; line 29, after "outlet" insert -- po --. Column 19, line 30, "openin gand" should read -- opening and --. Column 20, line 29, before "armature" insert -- an --; line 55, "directig" should read -- directing --. Column 25, line 40, "and" should read -- end --. Column 27, line 58, "and" should re -- end --. Column 28, line 28, "into" should read -- to --.

Signed and sealed this 24th day of March 1970.

(SEAL)
Attest:

EDWARD M. FLETCHER, JR.                      WILLIAM E. SCHUYLER, JF
Attesting Officer                               Commissioner of Patents